US008088494B2

(12) United States Patent
Bosson

(10) Patent No.: US 8,088,494 B2
(45) Date of Patent: Jan. 3, 2012

(54) VALUE EXTRACTION FROM HARVESTED TREES AND RELATED LAMINATES AND PROCESSES

(75) Inventor: Warwick Bosson, Auckland (NZ)

(73) Assignee: Wood Engineering Technology Limited, Auckland (NZ)

( * ) Notice: Subject to any disclaimer, the term of this patent is extended or adjusted under 35 U.S.C. 154(b) by 571 days.

(21) Appl. No.: 12/153,277

(22) Filed: May 15, 2008

(65) Prior Publication Data

US 2009/0000730 A1 Jan. 1, 2009

Related U.S. Application Data

(63) Continuation of application No. 11/223,208, filed on Sep. 12, 2005, now abandoned, which is a continuation of application No. PCT/NZ2004/000053, filed on Mar. 10, 2004.

(30) Foreign Application Priority Data

Mar. 10, 2003 (NZ) ........................................ 524672

(51) Int. Cl.
*B32B 31/00* (2006.01)

(52) U.S. Cl. ..................... 428/537.1; 428/167; 144/345; 144/346; 144/347; 144/354; 156/254

(58) Field of Classification Search ............... 428/537.1, 428/167; 144/345–347, 354; 156/254
See application file for complete search history.

(56) References Cited

U.S. PATENT DOCUMENTS

| | | | | |
|---|---|---|---|---|
| 3,345,244 | A * | 10/1967 | Stolesen et al. | 428/167 |
| 4,608,106 | A | 8/1986 | Lahtinen | 156/182 |
| 6,042,680 | A * | 3/2000 | Peterman | 156/254 |
| 2003/0010434 | A1 | 1/2003 | Grenier | 156/264 |

FOREIGN PATENT DOCUMENTS

| | | | |
|---|---|---|---|
| AU | 34412/02 | | 10/2002 |
| JP | 2002067010 | * | 3/2002 |
| SU | 909070 | | 3/1982 |
| WO | WO98/10157 | | 3/1998 |
| WO | WO98/56549 | | 12/1998 |
| WO | WO2004/005646 | | 1/2004 |

OTHER PUBLICATIONS

Derwent Abstract No. 2002-300182/34—JP 2002067010A (Yamasa Mokuzai) Mar. 5, 2002.
Derwent Abstract No. 2000-436012/38—JP 2000153508A (Sumitomo Forestry Co LTD) Jun. 6, 2000.
Derwent Abstract No. 96-387808/39—JP 8187706A (Misawa Homes Co LTD) Jul. 23, 1996.

* cited by examiner

*Primary Examiner* — Leszek Kiliman
(74) *Attorney, Agent, or Firm* — Jacobson Holman PLLC

(57) ABSTRACT

A laminate of laminae of uniform rectangular cross-sections or depths and lengths arranged randomly or otherwise in the laminate, such laminae having been derived from a feedstock comprising a population of logs (single or multigrade) wherein the population of laminae comprises all of the laminae that can be derived from the population of logs (exclusive only of laminae or material for laminae that are not of acceptable rectangular cross-section and/or length), and where each cross-section of each lamina represents a maximum of one thirtieth of the log cross-section, or the thickness of each lamina represents a maximum of one fifteenth of the small end log diameter.

10 Claims, 21 Drawing Sheets

Profile log and then slice

Saw log into rectangular blocks, then slice

Section on A A'

END ELEVATION

Edge glue the boards into a continuous panel

Fingers joints will be staggered

Representative MOE distributions sawn lumber (clear only) and thin boards (including defects) from low grade logs

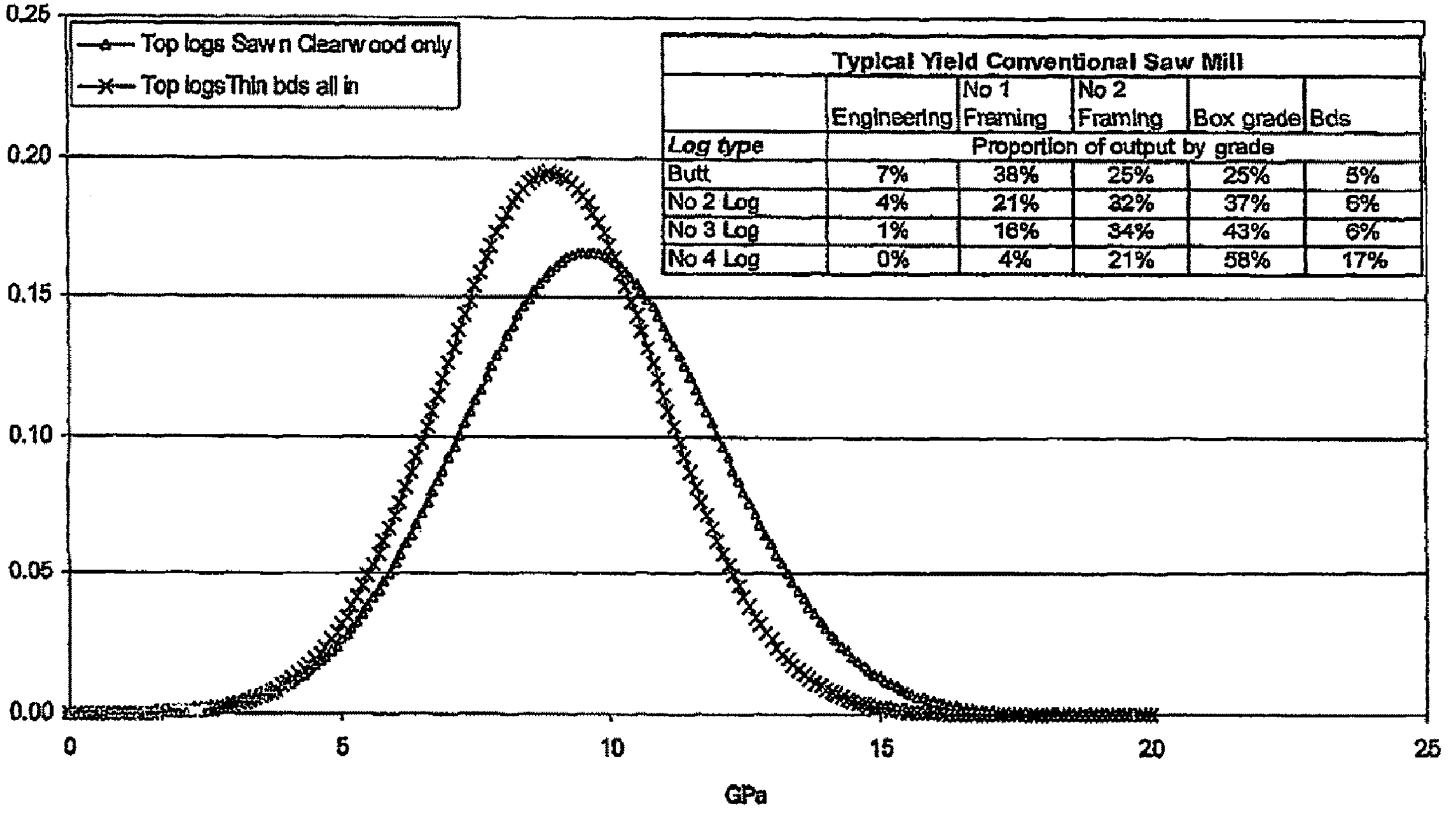

| Typical Yield Conventional Saw Mill | | | | | |
|---|---|---|---|---|---|
| | Engineering | No 1 Framing | No 2 Framing | Box grade | Bds |
| *Log type* | Proportion of output by grade | | | | |
| Butt | 7% | 38% | 25% | 25% | 5% |
| No 2 Log | 4% | 21% | 32% | 37% | 6% |
| No 3 Log | 1% | 16% | 34% | 43% | 6% |
| No 4 Log | 0% | 4% | 21% | 58% | 17% |

The top logs of Radiata pine are low grade and most are exported to Asia for use in manufacturing processes. The distribution of properties and the high incidence of defects and small diameter results in very low yields of structural lumber.

FIGURE 20

Based on known data the thin boards will be tested and streamed according to the desired property. This example is for 7 streams of 6.4 thick boards. Within each graded stream there will be a narrow range of desired properties.

Typical reassembly of 14 pieces of 6.4 x 45 thin boards into a 90 x 45

The boards can be reassembled into structural members with the highest performing boards on the outer dimensions in the axis of required strength or stiffness

VALUE EXTRACTION FROM HARVESTED TREES AND RELATED LAMINATES AND PROCESSES

This is a Continuation of U.S. application Ser. No. 11/223,208 filed Sep. 12, 2005 now abandoned, which in turn is a Continuation of PCT/NZ04/000053 Filed Mar. 10, 2004 and published in English.

TECHNICAL FIELD

The present invention relates to value extraction from tree stem materials (without any reduction to discrete fibre form) (i.e. from tree stem lengths) so as to provide engineered structural products and/or appearance products (e.g. laminates) which, especially when from lower valued material and/or lower valued logs of a tree stem, will represent lumber value enhancement.

BACKGROUND ART

Traditionally, dimensional lumber is produced for two main purposes:

"Structural" lumber is produced and graded for properties of strength and stiffness. "Early Wood" (core wood) has lower basic properties than "Late wood" and inclusion of "Early Wood" in a piece of dimensional lumber can cause strength down grading. Defects, (knots, resin pockets, bark inclusions, decay, insect attack, shakes, etc.) also lead to down grading although in pine knots have the dominant influence. These defects tend to be scattered through the length of a piece of lumber and lead to down grading on the basis of "a piece is only as strong as the weakest link".

"Appearance" lumber is produced and selected on the basis of surface appearance. Appearance grades can range from "Clears" for furniture type end uses to "merchantable" for exterior finishing. The important features are lack of defects particularly those that affect the surface finish. Inter-grown knots do not result in a down grade and for unpainted surfaces can be considered an attractive feature.

For any particular feedstock (log grade) and cutting regime a wide range of properties will be produced. The total output can be tested and graded or inspected and graded after initial sawing. Even within grades there is a wide range of properties.

This range of properties is produced when a log is broken down into (typically 100×50 mm) sections. If a log is broken down into even smaller sections (say 50×7 mm) we have found there will be a greater spread of properties.

With traditional dimensional lumber the output range is predominantly influenced by selection of feedstock (tree age, position in the tree, silver-culture regime) although there is some minor influence from the sawing patterns selected.

Examples of efforts in the past to meet demand for products other than pulp and paper have included dry fibre separation and reconstitution procedures as typified by U.S. Pat. No. 4,061,819 (Barnes). (MacMillan Bloedel Ltd) and LSL and LVL procedures as used by Trus Joist Corporation of Boise, Id., USA.

Weyerhaeuser Company PCT/US98/11566 (WO98/56549) discloses composite lumber products based on sweep avoiding slat production from flitches derived from round logs.

MacMillan Bloedel Limited in NZ 241289 (also referring Holman U.S. Pat. No. 4,255,477 in respect of panel or strand lumber products and U.S. Pat. Nos. 4,610,913 and 4,751,131 of Barnes in respect of the use of longer wafers in higher strength lumber product production) discloses composite wood products of improved strength where cutting avoids surface and internal damage to the veneer, wafers and strands.

Weyerhaeuser Company PCT/US97/15250 (WO98/10157) discloses engineered structural wood products and related methods reliant on different rectangular board orientations in the resultant laminated product.

U.S. Pat. No. 5,500,070 (Traben et al) discloses knife cutting of thin boards for the purpose of manufacturing multi-layered laminated products.

Nevertheless efficiencies of usage while still providing acceptable engineered lumber products especially to customer demand can still further be improved where source materials are single or multi forest derived single or multi grade logs.

The present invention as an object or an alternate object addresses issues of waste reduction during the production of dimensional lumber and in so doing preferably improves usage of feedstock for the purpose of value enhancement.

The present invention has as one or one alternative object a method of producing laminated elongate products and to related products, practices and procedures reliant on a performance advantage over mere random assembly.

The present invention has as one or an alternative object an overall process capable of better using logs or part of tree stems (and particularly those of conifers such as Radiata Pine, Loblolly Pine, Douglas Fir, Spruce, etc.) which might otherwise only be suitable for chipping or non structural or non appearance lumber.

Another or an alternative object therefore, as will become apparent, is the conversion of low grade wood into high grade products preferably at an efficient yield from trees.

DISCLOSURE OF INVENTION

We believe there is sufficient variation of structural properties within a tree stem and between stems in a forest resource that when the logs are broken down into 30 or more thin boards per log, tested for structural properties, sorted into like properties and judicially re-assembled by laminating then the resultant lumber will have mean structural performance at least 10% higher than conventionally produced lumber (See FIG. 24 hereafter), have a lowest structural property (90% confidence) of approximately twice that from conventionally produced lumber (See FIG. 24 hereafter), have a very low or zero incidence of critical defects.

We believe there is sufficient variation of appearance properties within a tree stem and between stems in a forest resource that when the logs are broken down into 15 or more thin wide boards per log (where the thickness is less than one fifteenth of the Small End Diameter "SED"), scanned for appearance properties, sorted into like properties and judicially re-assembled by laminating edge gluing and finger jointing then the resultant lumber will yield at least twice and we estimate at least approximately 3 times the appropriate appearance grade from that resource as would otherwise be available from conventional sawn lumber.

The present invention is a novel advancement on the traditional methods of producing dimensional lumber as it takes advantage of the following:

1. Breakdown of logs into many small parts (preferably a minimum of 30 parts per log cross-sectional all of equal thickness) and random assembly by lamination provides the opportunity to randomise any defects and limit their influence on strength or appearance characteristics, thus improving the average performance over traditional dimensional lumber.

2. Breakdown into many small parts reveals the statistical spread of strength and appearance properties inherent within a log and between any group of logs. Grading, sorting and streaming these parts can significantly improve the performance of the assembled finished product over and above the improvements from random assembly.
3. We contend that there is sufficient high strength board extraction derivable from on low value upper log forming regions of a tree, or immature trees, or from short logs (normally wasted), or from logs with excessive taper or bend which can be reduced to short logs as feed stock for this process, especially provided an effective process provides both high yield and does not involve any mandatory substantial encroachment into materials extracted from high value lowermost logs of the tree. Such encroachment can nevertheless be allowed as and when wanted.

The process envisages the breaking of a log into small (preferably rectangular) sections, grading these sections (preferably once dry) and assembling these in accordance with the invention into an improved product.

As well, by the inherent nature of the process, the precise dimensions the customer wants can be produced. Also because the output is laminated it will have good dimensional stability. These features also have considerable value to the customer.

The process of the present invention breaks down logs into specific component parts (i.e. thin boards) (e.g. hereinafter "sticks") to provide a large population of parts (i.e. many parts from many logs) exhibiting a wide range of properties strength/stiffness/appearance which at the discretion of the processor (preferably with (a) end jointing and/or (b) determination and/or assessment) are streamed to produce a high proportion of superior laminates as products from a small proportion of superior strength or appearance parts.

As used herein "stick" or "sticks" refers to thin boards whether trimmed for length or otherwise trimmed to reduce distortions and/or blemishes.

As used herein "boards" includes but preferably means rectangular or square sectioned boards. Such boards of any length (usually between 0.5 m to 2.4 m in length) may post drying require some trimming to a dimensional lumber width.

As used herein "engineered" in respect of product or boards means or includes fabricated and/or laminated.

As used herein "sections" or "small sections" means or includes preferably smaller rectangular sections preferably of lamina thickness.

As used herein "stem" or "stems" refers to any trunk and/or branch.

As used herein "drying" involves any suitable process whereby "green" wood is brought to a state of dryness (e.g. 200% to <12% w/w).

As used herein "splitting" includes a process typified by that of Linck disclosed at its website www.linck-hvt.com or in any of its patents referred to herein.

As used herein "customer" in respect of length, width or any other dimension or appearance means that required by a wholesaler, retailer or end user whether to be cut further or not.

As used herein "grading/assessing" is any machine, optical or manual procedure to determine structural and/or strength and/or stiffness and/or appearance characteristics.

As used herein "and/or" means "and" or "or".

As used herein "(s)" following a noun includes the singular and plural forms of the noun.

Reference to "streaming", etc. means streaming into at least two streams (e.g. preferably from 4 to 8 but can be more or less).

In one aspect the invention is a laminate of laminae (e.g as engineered structural and/or appearance lumber preferably made to length), each lamina having been derived from a feedstock comprising a population of logs (single or multi-grade), each cross-section of each lamina being uniform at least insofar as depth and representing a maximum of one twentieth of the log cross-section for structural products or each lamina having a thickness not greater than one fifteenth of SED for wide appearance lamina, and arranged with a profiled array of their properties in the laminate.

Preferably each lamina represents a maximum of one thirtieth of the log cross-section.

Preferably breakdown from logs is in a pattern to minimise spike knots.

Preferably the total breakdown is or has been to effect, as far as is practical, a maximising of the spread of properties amongst laminae ["sticks"].

Preferably the cutting of each stick is or has been from a minimum number of growth years as is practical.

The laminate has been made to specification.

Where the laminate is engineered structural timber, the profiling has been with respect to strength and/or stiffness [e.g by reference to Modulus of Elasticity [MOE] or other measure or assessment].

Where the laminate is engineered appearance lumber the profiling has been with respect to appearance thereby to maximise the external appearance especially on one side.

The laminate preferably has been prepared by reliance upon variation of structural properties within a tree stem and between stems in a forest resource such as, in the case of engineered structural timber, the logs have been broken down into at least 20 [preferably 30 or more] thin boards or sticks per log preferably to ensure a mean structural performance between 10 and 20% higher than milled lumber, and/or having a lowest structural property (90% confidence) of approximately twice that of milled lumber, and/or having a very low or zero incidence of critical defects.

Preferably there has been reliance upon sufficient variation of appearance properties within a tree stem and between stems in a forest resource, where the logs have been broken down into at least 15 [preferably 20 or more] thin boards or sticks per log, scanned for appearance properties, sorted into like properties and judicially reassembled by (in any order) laminating, edge gluing and finger jointing preferably so as to provide a yield at least twice that of comparable appearance grade lumber that resource would have otherwise made available from milled lumber.

In another aspect the invention is a method of producing engineered "structural" lumber which comprises or includes the steps of deriving thin boards at uniform laminar thickness (hereafter "sticks") from a feedstock of single forest or multiple forest derived single or multi grade logs (preferably a minimum of at least 20, but more preferably of at least 30 sticks, per log cross-section to expose a broad range of properties), drying the sticks at least to some extent, (optionally) taking each stick to its substantially finished width by any suitable means, testing or assessing each stick for at least one structural property and streaming them as a result of such testing or assessing, endwise joining sticks of each stream and of finished width to at least the length of the lumber to be engineered, laminating the endwise joined sticks and/or sticks from a plurality of streams so as to provide an appropriate strength and/or stiffness profile to achieve the desired strength and/or stiffness characteristic required for the engineered lumber.

Preferably the sticks are of uniform laminar thickness.

Preferably a minimum of 30 sticks per log cross-section are obtained to expose a broad range of properties.

Preferably prior to laminating the endwise joined sticks and/or sticks have been cut to customer length. The length of each stick or stick sequence is from 0.5 to 2.4 meters. Whilst the length can be 1.2 to 2.4 meters, preferably the length of each stick is from 0.5 to 1.2 meters.

In another aspect the invention consists in a method of producing an engineered "appearance" lumber which comprises or includes the steps of deriving thin boards of uniform lamina thickness (hereafter "sticks") from a feedstock of single forest or multiple forest derived single and/or multi grade logs. (preferably a maximum thickness one fifteenth (1/15) of small end diameter to expose the range of properties), drying the sticks at least to some extent, (optionally) taking each stick to clean width increment by any suitable means, assessing each board for appearance and streaming by appearance property and width increment for endwise joining of sticks, endwise joining sticks to at least the length of the lumber to be engineered, panel forming to at least a desired width the endwise joined sticks, forming boards of desired width from the panel or panels, and laminating boards thus formed (optionally with others) so as to provide an appropriate exterior appearance for the engineered lumber.

Preferably sticks are derived with a uniform laminar thickness.

Preferably each stick has a maximum thickness one fifteenth (1/15) or less of the small end diameter of the log(s).

The length of each stick is from 0.5 to 2.4 meters. Whilst it can be preferably the length of each stick is from 0.5 to 1.2 meters.

The sticks derived from a population of logs and hence the laminae incorporated into the corresponding population of laminates would be of uniform thickness with the thickness preferably being chosen prior to breakdown of the logs. Such thickness preferably would be not less than 4 mm and not greater than 17 mm.

The aforesaid range ensures a thickness can be chosen that is amenable to the production and processing of sticks, while ensuring an adequate number of sticks can be produced to reveal the spread of properties and ensure a laminate will comprise at least 3 laminae for an appearance product and preferably at least 4 laminae for a structural product.

In practice the chosen thickness would normally be between 6 mm and 11 mm.

Preferably breakdown from logs is in a pattern to minimise spike knots.

Preferably the total breakdown is or has been to effect, as far as is practical, a maximising of the spread of properties amongst lamina ["sticks"].

Preferably the cutting of each stick is or has been from a minimum number of growth years as is practical.

The sticks derived from a population of logs and hence the laminae incorporated into the corresponding population of laminates would be of uniform thickness with the thickness preferably being chosen prior to breakdown of the logs. Such thickness preferably would be not less than 4 mm and not greater than 17 mm.

The aforesaid range ensures a thickness can be chosen that is amenable to the production and processing of sticks, while ensuring an adequate number of sticks can be produced to reveal the spread of properties and ensure a laminate will comprise at least 3 laminae for an appearance product and preferably at least 4 laminae for a structural product.

In practice the chosen thickness would normally be between 6 mm and 11 mm.

In another aspect the invention consists in a method of producing an engineered "appearance" lumber which comprises or includes the steps of deriving thin boards of uniform lamina thickness (hereafter "sticks") from a feedstock of single forest or multiple forest derived single and/or multi grade logs, drying the sticks at least to some extent, (optionally) taking each stick to clean width increment by any suitable means, assessing each board for appearance and streaming by appearance property, panel forming to at least a desired width the sticks of common grade, forming boards of desired width from the panel or panels, endwise joining the boards to at least the length of the lumber to be engineered, and laminating boards thus formed (optionally with others) so as to provide an appropriate exterior appearance for the engineered lumber.

Preferably the sticks are derived with a uniform laminar thickness.

Preferably each stick has a maximum thickness one fifteenth (1/15) or less of the small end diameter of the log(s).

Preferably the length of each stick is from 0.5 to 2.4 meters.

Preferably the length of each stick is from 1.2 to 2.4 meters.

Preferably the length of each stick is from 0.5 to 1.2 meters.

Preferably the sticks and/or endwise joined sticks have been cut to a customer length prior to lamination.

Preferably better appearance boards are to the outside of the transverse section of the main faces of the laminated product.

In another aspect the present invention consists in a method of producing engineered "structural" lumber which comprises or includes the steps of deriving thin boards at laminar thickness (hereafter "sticks") from a feedstock of single forest or multiple forest derived single and/or multi grade logs, drying the sticks at least to some extent, (optionally) taking each stick to its finished width by any suitable means, testing or assessing each stick for at least one structural property and as a result of such testing or assessing, streaming them endwise joining sticks of each stream and of finished width to at least the length of the lumber to be engineered, laminating the endwise joined sticks and/or sticks from a plurality of streams thereof so as to provide an appropriate strength and/or stiffness profile to achieve the desired strength and/or stiffness characteristic required for the engineered lumber.

Preferably the sticks and/or endwise joined sticks have been cut to a customer length prior to lamination.

Preferably higher strength and/or stiffness sticks are to the outside of the transverse section of the laminated product.

Preferably any one or more of the features of the system is substantially as hereinafter described with reference to any one or more of the accompanying drawings.

In yet a further aspect the present invention consists in a method of producing an engineered "appearance" lumber which comprises or includes the steps of deriving thin boards at laminar thickness (hereafter "sticks") from a feedstock of single forest or multiple forest derived single and/or multi grade logs, drying the sticks at least to some extent, (optionally) taking each stick to its finished width by any suitable means, assessing each board for appearance and streaming for endwise joining sticks, endwise joining sticks to at least the length of the lumber to be engineered, panel forming to at least a desired width the endwise joined sticks, forming boards of desired width from the panel or panels, and laminating boards as aforesaid (optionally with others) so as to provide an appropriate exterior appearance for the engineered lumber.

Preferably the sticks have been cut to a customer length prior to lamination.

Preferably better appearance boards are to the outside of the transverse section of the main faces of the laminated product.

Preferably any one or more of the features of the system is substantially as hereinafter described with reference to any one or more of the accompanying drawings.

In another aspect the present invention consists in a method of producing dimensional lumber reliant upon a breakdown of the source wood to boards and the subsequent use of such boards with knowledge of their individual gradings (preferably after drying) for streaming and/or placement in a laminate structure.

Preferably breakdown from logs is in a pattern to minimise spike knots.

Preferably the total breakdown is or has been to effect, as far as is practical, a maximising of the spread of properties amongst laminae ["sticks"].

The sticks derived from a population of logs and hence the laminae incorporated into the corresponding population of laminates would be of uniform thickness with the thickness preferably being chosen prior to breakdown of the logs. Such thickness preferably would be not less than 4 mm and not greater than 17 mm.

The aforesaid range ensures a thickness can be chosen that is amenable to the production and processing of sticks, while ensuring an adequate number of sticks can be produced to reveal the spread of properties and ensure a laminate will comprise at least 3 laminae for an appearance product and preferably at least 4 laminae for a structural product.

In practice the chosen thickness would normally be between 6 mm and 11 mm.

In another aspect the present invention consists in a method of deriving an elongate laminate product from a tree or logs thereof, said method comprising or including (I) deriving logs of short length and/or of a variety of lengths, (II) (optionally) profiling longitudinally at least part of the periphery of each log, (III) longitudinally breaking such log lengths or at least part profiled logs down to boards, such breakdown to boards at least predominantly deriving surfaces defined by a longitudinal splitting and/or sawing (although at least one or some of the surfaces of each or some boards can be optionally dressed surfaces), (IV) drying the boards, (V) endwise finger jointing at least some of the dried boards a. of similar or the same transverse dimensions and
b. of like characteristics (e.g. selected from some assessment of at least one of the characteristics selected from the group of stiffness, strength and appearance) in order to derive boards of greater length (e.g. to at least customer length), and (VI) laminating such boards to derive a laminated elongate product, such lamination being to provide both or either (i) a structural member (e.g. beam, stud, etc.) having greater transverse dimension or bending resistance, or both, in a plane normal to the plane or planes of lamination rather than parallel thereto, boards of known characteristics being substantially optimally positioned in the laminated section, and/or
(ii) a structural or other member having its greater transverse dimension parallel to the laminating plane or planes (and, optionally, having one exposed face of greater transverse dimension as an appearance face), boards of known characteristics being substantially optimally positioned in the laminated section.

In another aspect the present invention consists in an elongate engineered timber product having a laminated transverse substantially rectangular or square cross section transverse to the longitudinal axis, wherein the cross section i. in one of its major or minor axes is co-extensive with the transverse width parallel to that same axis of each lamina. and
ii. in the other of its major or minor axes, has the accumulated thicknesses of the individual lamina, and wherein each or any lamina is over the length of the product either (I) a unitary stick from a log, or
(II) an endwise (e.g. finger jointed, lap jointed, and/or other such jointed) joined structure of at least two sticks ("stick components") from a log or logs, and has the grain of its stick or stick components running at least substantially longitudinally of said longitudinal axis, and wherein there has been a profiling of laminae strength and/or stiffness characteristics across that transverse axis of accumulated thickness thereby to engineer a strength and/or stiffness characteristic of the product in planes normal to such thicknesses.

In another aspect the present invention consists in an elongate engineered timber product having a laminated transverse substantially rectangular or square cross section transverse to the longitudinal axis, wherein the cross section (a) in one of its major or minor axes is co-extensive with the transverse width parallel to that same axis of each lamina, and
(b) in the other of its major or minor axes, has the accumulated thicknesses of the individual lamina, and wherein each or any lamina is over the length of the product either (I) a unitary stick from a log, or (II) an endwise (e.g. finger jointed, lap jointed, and/or other such jointed) joined structure of each at least two sticks ("stick components") matched as to strength and/or stiffness from a log or logs, and has the grain of its stick or stick components running at least substantially longitudinally of said longitudinal axis, and wherein there has been a profiling of laminae strength and/or stiffness characteristics across that transverse axis of accumulated thickness thereby to engineer a strength and/or stiffness characteristic of the product in planes normal to such thicknesses, such profiling having the effect of at least emphasising the presence of stronger and/or stiffer sticks to the outside of the transverse section.

In another aspect the present invention consists in an elongate engineered timber product made to length L and having a laminated transverse substantially rectangular or square cross section transverse to the longitudinal axis, wherein the cross section (a) in one of its major or minor axes is co-extensive with the transverse width parallel to that same axis of each lamina, and (b) in the other of its major or minor axes, has the accumulated thicknesses of the individual lamina, and wherein at least most laminae over the length L of the product are an endwise (e.g. finger jointed, lap jointed, and/or other such jointed) joined structure of sticks derived from a log resource with the grain of its stick components running at least substantially longitudinally of said longitudinal axis, and wherein there has been a profiling of laminae strength and/or stiffness characteristics across that transverse axis of accumulated thickness thereby to engineer a strength and/or stiffness characteristic of the product in planes normal to such thicknesses.

In another aspect the present invention consists in an elongate engineered timber product made to length L and having a laminated transverse substantially rectangular or square cross section transverse to the longitudinal axis, wherein the cross section (a) in one of its major or minor axes is co-extensive with the transverse width parallel to that same axis of each lamina and (b) in the other of its major or minor axes, has the accumulated thicknesses of the individual lamina, and wherein at least a sufficient number of the laminae is over the length L of the product are an endwise (e.g. finger jointed, lap jointed, and/or other such jointed) joined structure, each of longitudinally aligned and matched as to strength and/or stiffness, sticks derived from log resource(s), and wherein there has been a profiling of streamed laminae already endwise joined of total length of at least L across that transverse axis of accumulated thickness thereby reliant on stronger and/or stiffer laminae being placed to the outside to engineer a strength and/or stiffness characteristic of the product in planes normal to such thicknesses.

In another aspect the present invention consists in elongate engineered timber products, wherein each product having a laminated transverse substantially rectangular or square cross section transverse to its longitudinal axis, and wherein the cross section of each product (a) in one of its major or minor axes is co-extensive with the transverse width parallel to that same axis of each lamina and (b) in the other of its major or minor axes, has the accumulated thicknesses of the individual lamina, and wherein at least some laminae over the length of each product is an endwise (e.g. finger jointed, lap jointed, and/or other such jointed) joined structure of sticks, each such stick being derived from a log, and wherein using a sufficient log resource laminae strength and/or stiffness characteristics have been profiled across that transverse axis of accumulated thickness thereby to engineer for each product a strength and/or stiffness characteristic of each of the products in planes normal to such thicknesses.

In another aspect the present invention consists in an elongate engineered timber product of length L having a laminated transverse substantially rectangular or square cross section transverse to the longitudinal axis, wherein the cross section (i) in one of its major or minor axes is co-extensive with the transverse width parallel to that same axis of each lamina. and (ii) in the other of its major or minor axes, has the accumulated thicknesses of the individual lamina, and wherein at least some laminae over the length L of the product is an endwise (e.g. finger jointed, lap jointed, and/or other such jointed) joined structure of sticks ("stick components") of length much less than L derived from log resources, and wherein there has been a profiling of laminae characteristics across that transverse axis of accumulated thickness thereby to best face the outside of the product on the opposed faces not showing the accumulated thicknesses, and wherein each said endwise joined structure has been of at least length L prior to lamination and with at least some having been to a length greater than L.

In respect of any of the foregoing there are the following preferences and/or options.

The sticks derived from a population of logs and hence the laminae incorporated into the corresponding population of laminates would be of uniform thickness with the thickness preferably being chosen prior to breakdown of the logs. Such thickness preferably would be not less than 4 mm and not greater than 17 mm.

The aforesaid range ensures a thickness can be chosen that is amenable to the production and processing of sticks, while ensuring an adequate number of sticks can be produced to reveal the spread of properties and ensure a laminate will comprise at least 3 laminae for an appearance product and preferably at least 4 laminae for a structural product.

In practice the chosen thickness would normally be between 6 mm and 11 mm.

Preferably the logs are derived from debarked tree stems or debarked longer log lengths.

Preferably the logs are at least primarily in the range of from 0.5 m to 2.4 m in length.

The logs may include primarily or may include a good percentage of higher tree stem regions.

Preferably said profiling is performed so as to assist by the provision of at least one datum flat and one datum edge to facilitate breakdown.

Preferably the optional profiling is to provide at least one datum flat and edge to facilitate breakdown by either (i) splitting by a longitudinal splitting procedure (e.g. as hereinafter described) or (ii) a sawn breakdown of the log lengths to billets and thereafter the further breakdown of at least some of the billets to boards reliant upon a longitudinal splitting procedure (e.g.; as hereinafter described).

Preferably the profiling is such as to provide a contour of the log periphery which best provides boards or billets reducible to boards by a splitting process with boards of greater transverse section symmetrically cut from the log.

The profiling can include the provision of four flats for the purpose of subsequent breakdown and, if desired, rebates to ensure an ensuing splitting process can provide at least primarily boards of rectangular section and/or square section.

In some forms at least some initial longitudinal breakdown by sawing can occur and this may include the profiling steps and/or some initial billet provision for subsequent further longitudinal breakdown by preferably a splitting procedure.

Preferably the splitting procedure involves the still "green" wood being heated to facilitate splitting, (e.g. by any of the processes herein described (e.g. bath, steam chamber, or other non drying heating process)).

Preferably the characteristics of the boards is determined wholly or primarily post drying. The determination of the characteristics of the boards can follow or precede, or both, trimming of at least one transverse dimension of at least some of the boards.

Preferably boards of a suitable appearance may be selected by inspection and/or scanning as "appearance" boards whilst preferably boards (whether appearance boards or otherwise) may be assessed by inspecting and/or scanning and/or grading for strength and/or stiffness.

Preferably the endwise finger jointing of at least some of the dried boards is to provide a feedstock of boards at least as great as a desired customer length or multiple of desired customer length (such as 2.4 m in length or greater) even if there may be a subsequent cutting step at the time of or post or during lamination.

Preferably the method just described provides streams of dimensional appearance and/or structural timber.

In another aspect the present invention consists in a method of deriving an elongate laminate product from a tree, said method comprising or including scanning tree stems and/or logs after debarking and deriving log lengths of lower value tree stem regions that are substantially defect free (preferably from those regions upwardly of the butt log), [the logs preferably being at least mainly from 0.5 m to 2.4 m in length] (or 1.2 m to 2.4 m), profiling at least in part the exterior of each log, longitudinally breaking such at least in part profiled log lengths down to boards reliant as a datum on at least part of the log profiling, such breakdown at least predominantly deriving surfaces of the boards defined predominantly by a longitudinal splitting and/or sawing, drying the boards, and both or either:

(A) inspecting, scanning and/or grading the boards [before and/or after, optionally trimming at least one side of some or all boards to extent required to match boards for transverse section and/or to customer width], endwise finger jointing at least some of the boards of the same or substantially same transverse dimensions, and optionally substantially same grade, to assemble an elongated composite board [and, if necessary, prior to or post lamination transversely cutting the elongated composite board in order to derive boards to customer length (preferably greater than 2.4 m in length)], and laminating such boards in a process to derive an elongate laminate product of customer length, such lamination being to provide a structural member (e.g. beam, stud, etc.) having by appropriate placement of different characteristics in the laminate a desired structural performance, (B) inspecting, scanning and/or grading the boards (before and/or after optionally trimming at least one side of some or all boards to extent required to match boards for transverse section and/or to customer width), endwise finger jointing at least some of the transversely dimensioned boards of the same or substantially same transverse dimensions, and optionally substantially same grade, to assemble an elongated composite board [and, if necessary, prior to or post lamination transversely cutting the elongate composite board in order to derive boards to customer length (preferably greater than 2.4 m in length)], and laminating such boards in a process to derive an elongate laminate product of customer length, such lamination being to provide a structural or other member having its greater transverse dimension parallel to the laminating plane or planes and having one exposed face of greater transverse dimension as an appearance face.

Preferably the optional profiling is to provide at least one datum flat and edge to facilitate breakdown by either (i) splitting by a longitudinal splitting procedure (e.g. as hereinafter described) or (ii) sawing of the log lengths to billets and thereafter the further breakdown of at least some of the billets to boards reliant upon a longitudinal splitting procedure (e.g. as hereinafter described).

Preferably the profiling is such as to provide a contour of the log periphery which best provides boards or billets reducible to boards by a splitting process with boards of greater transverse section symmetrically cut from the log.

Preferably the method is performed substantially as hereinafter described with reference to any one or more of the accompanying drawings.

In a further aspect the present invention consists in a method of value extraction from tree stem timber so as to provide engineered structural products and/or appearance products, which when from lower valued material and/or lower valued logs of a tree stem, will represent lumber value enhancement reliant upon a method of deriving elongate laminate products by a method of the present invention.

In another aspect the invention is an elongate dimensional structural and/or appearance timber product, the product being a laminate of at least primarily sliced boards of previously determined characteristics (i.e. as a board post board creation) thereby having allowed selective positioning of such boards in the laminate to allow use of boards of different characteristics yet still provide the desired (i) structural, (ii) appearance or (iii) both (i) and (ii) outcome.

Preferably at least one of the boards has been finger jointed prior to lamination to provide the required length.

Preferably each of the boards has had its characteristics determined post drying, etc.

Preferably the outcome is (i) or (iii).

Preferably the separation of characteristics is in a spaced minor axis sense for structural requirements.

In another aspect the present invention consists in a method of producing such a timber product, which method includes at least (A) (I) board creation and grading/assessing, or (II) grading/assessing and board creation, AND (B) lamination of boards when dry reliant for placement on such grading/assessment.

Preferably breakdown from logs is in a pattern to minimise spike knots.

Preferably the total breakdown is or has been to effect, as far as is practical, a maximising of the spread of properties amongst lamina ["sticks"].

Preferably the cutting of each stick is or has been from a minimum number of growth years as is practical.

In yet a further aspect the present invention consists in a panel or panels formed by or during performance of a method as aforesaid.

In another aspect the invention is a laminate, engineered structural lumber or engineered appearance lumber made by a method of the present invention.

In a further aspect the invention consists in a laminate of laminae of uniform rectangular cross-sections or depths and lengths arranged randomly in the laminate, such laminae having been derived from a feedstock comprising a population of logs (single or multigrade) wherein the population of laminae comprises all of the laminae that can be derived from the population of logs (exclusive only of laminae that are not of acceptable rectangular cross-section and/or length), and where each cross-section of each lamina represents a maximum of one twentieth (preferably a maximum of one thirtieth) of the log cross-section, or the thickness of each lamina represents a maximum of one fifteenth of the small end log diameter.

Preferably at least some of the laminae result from streaming of endwise joined parts thereof.

Preferably no substantial pith content is in outside laminae.

The sticks derived from a population of logs and hence the laminae incorporated into the corresponding population of laminates would be of uniform thickness with the thickness preferably being chosen prior to breakdown of the logs. Such thickness preferably would be not less than 4 mm and not greater than 17 mm.

The aforesaid range ensures a thickness can be chosen that is amenable to the production and processing of sticks, while ensuring an adequate number of sticks can be produced to reveal the spread of properties and ensure a laminate will comprise at least 3 laminae for an appearance product and preferably at least 4 laminae for a structural product.

In practice the chosen thickness would normally be between 6 mm and 11 mm.

In yet a further aspect the invention consists in a laminate of laminae of uniform rectangular cross-sections or depths and lengths arranged randomly or otherwise in the laminate, such laminae having been derived from a feedstock comprising a population of logs (single or multigrade) wherein the population of laminae comprises all of the laminae that can be derived from the population of logs (exclusive only of laminae or material for laminae that are not of acceptable rectangular cross-section and/or length), and where each cross-section of each lamina represents a maximum of one twentieth of the log cross-section, or the thickness of each lamina represents a maximum of one fifteenth of the small end log diameter.

Preferably each lamina represents -a maximum of one thirtieth of the log cross-section.

Whilst minimising wastage is a significant attribute of the process of the present invention the primary value arises from taking advantage of two facts, 1) that high performance dimensional lumber products do not need to contain the "performance defining wood" throughout their bulk (i.e. structural products only require high strength wood in outer elements of the cross-section, appearance products only require an appearance grade surface), and
2) there is a natural distribution of wood properties within a log and between logs.

In order to keep lost fibre to acceptable limits the process preferably employs slicing and/or fine band saw technology for the bulk of its breakdown into sections.

As well because the process contemplates finger jointing or any acceptable alternative (lap jointing) into a continuous length before cutting to a customer required length, as an integral part of the process, short logs ("shorts") can be used or created from logs with excessive bend or taper. The value of the process is driven more by its ability to use low value logs than by maximising yield, however the process is preferably able to keep yields above acceptable minima.

The process can add value to any log—including butt logs. In practice the process targets low value (i.e. low cost) logs only because it is expected they will produce the highest margin.

The present invention in its preferred forms is also based upon the contention that there is sufficient high strength board extraction derivable from low value upper log forming regions of a tree, and from shorts provided an effective process of high yield and not involving any mandatory substantial encroachment into materials extracted from high value lower most logs of the tree is available, yet still allowing such encroachment as and when wanted.

The present invention in another aspect also recognises a capability of cutting upper regions, (e.g. optionally beyond those of the butt log and perhaps or preferably above the second log) into short lengths [in order to counter the influence of taper, sweep, curvature, etc.], thereafter machining with minimal sawing smaller diameter logs than those of a butt log and shorter in length (e.g. 0.5 m to 2.4 m) into boards, drying such boards, matching boards after the drying procedure, edge trimming if required to a required transverse dimension, endwise joining by finger jointing at least to a customer required length, thereafter (a) preparing directly laminated and dimensional structural timbers or,
(b) after a panel forming procedure, slitting (e.g. by shearing or fine sawing) from the panel boards of customer required transverse dimension to allow their subsequent use in appearance and/or structural laminates.

The following process options are proposed in order to meet one or more of the foregoing objects:

A Sectioning

Sectioning options (method of breaking down the cross section after cutting the logs to length) are a trade off between yield and technical risk/process complexity. There are at least two sectioning options contemplated. The sectioning option is independent of the targeted output (structural or appearance).

1. Sectioning option 1 would be chosen if a machine of the correct size could be purchased at reasonable cost and the technical issues surrounding the "slice overhang" was easily dealt with.
2. Sectioning option 2 can be used with existing equipment and has very low technical risk.

B Outputs

The process can produce three outputs by employing three process scenarios.

1. ALL-IN. If the process simply slices the logs into, say, approximately 10 mm width increments (maximum width of up to log small end diameter—SED), at about 6.5 mm thick, dry the resultant boards, edge dress and finger joint like width boards into customer required length (approximately 20 different widths), and edge joint these into a panel; this panel can be slit into widths which coincide with the customer required lumber width and laminate these re-slit boards into the customer required thickness. This process will produce an "all in" product. By accident some of the slit boards may grade as appearance and these could be put to the outside of any laminated board. This process could produce a large panel substrate for addition of finishing veneers. The structural sections produced would be some improvement on sawn timber strength because of the random positioning of defects in a six layer major axis laminate and the statistical reduction in the range and hence number of products in a given sample falling below the minimum required strength. This may be the preferred process if the output had a high proportion of No 1 framing or better even using low value input, and if a significant market does not exist for superior product. NOTES: The 10 mm width increments lead to a large number of board widths to deal with but higher yields for either sectioning option. A 20 mm width increment would halve the number of board width lines for a small decrease in yields. The process may well be edge jointing boards only to re-slit these into dimensions not much different from the original board width.

2. APPEARANCE. If the process were to target a large proportion of appearance grade products it could follow the same process except that it would grade each board into, say, about 3 grades before finger jointing. This would necessitate 3 times more finger jointing streams and three edge jointing streams but would result in a far higher yield of appearance grade output, (more than three times greater). The resultant slit down panels (i.e. those produced by edge gluing) would be laminated with the best grade on one side the second best on the other side and the lowest grade in the middle. (Assuming 19 mm thickness for appearance products).
3. STRUCTURAL. If the process were to target predominantly structural outputs then it would slice into width increments of 46 mm (or other common finished thickness). The process would slit each of the boards after drying and during edge dressing into the 46 mm width (or other green pre-dressed customer width) and grade into at least 2 grades for finger jointing. The panel production and re-slitting step would be eliminated. The finger jointed boards would be laminated about the minor axis up to the customer required section width. NOTES: If there is a high incidence of full width defects which cause the 46×6.5 mm sections to break during the process then the process will need to consider the cost of rework versus an option to grade at sliced width, finger joint and laminate to a double laminate before slitting to customer required thickness and re-grading.

As well as these three options a mix and match scenario incorporating the appropriate features of each of these options may be appropriate for producing a mixed output.

Preferred Actual Process Steps

1. Logs will be debarked in the usual manner.
2. These logs will be cut to the process length range.
   The process length will be between some maximum (L max) and some minimum (L min) but subject to the following rules.
   L min is half L max thus any straight log greater than L min can be entirely processed.
   Logs with excessive bend or taper would be cut into sections which maximised the yield by tending to cut shorter than L max would allow and/or perhaps even discarding a short piece.
   All saw cuts will avoid the "Whorls" such that the process will not need to finger joint through any knots.
3. EITHER: the log will have four "flats" cut in 20 mm across the flats increments, streamed, profiled, heated and sliced. Profiling may be carried out prior to each slice in a continuous profiling slicing operation or the profiling may be entirely completed before slicing. (or some process in between)
4. OR: The logs will be sawn into rectangular sections in the appropriate dimension increment. Rectangular sections of like dimensions will be streamed. These rectangular sections may require some dressing. These rectangular sections will be heated and sliced.
5. The sliced boards may be restrained and dried in such a manner to retain straightness and minimise shakes (internal splits) or dried unrestrained. This could be by conventional batch methods or a continuous method that takes advantage of the prospect of being able to rapidly dry thin sections. Also, the thin sections mean the process can consider infra red or micro wave as well as normal hot-air convection methods.
6. Optionally: Grade for appearance characteristics and separate into "like property" streams accordingly.
7. Edge dress the boards to account for differential shrinkage.
8. Optionally: Slit to required width (Customer required width or thickness).
9. Optionally: Grade for strength and separate into "like property" streams accordingly.
10. Finger joint boards of like width and/or like grade into a multiple of customer required length.
11. Optionally: Edge joint the resultant boards into a continuous panel either random or by grade and re-slit this panel into the customer required dimension. (Width or thickness). The process may wish to produce wide panels. The process may wish to laminate two panels before further slitting to avoid unstable narrow laminates.
12. Optionally: Grade the slit boards by appearance or strength properties.
13. Laminate these boards (laminae) into the customer required dimensions and properties, randomly OR by selected layers of appearance graded boards (lamina) OR by selected layers of strength graded boards (laminae).

Preferred forms of the present invention will be described hereinafter with reference to two preferred streamings occurring downstream of a drying procedure.

Irrespective however of the streaming preferably endwise finger jointing occurs post a drying stage.

Whilst reference is made to post drying characteristic assessment/grading in some forms where less dry or green boards can correlate in characteristics to the dry or more dry boards such assessment/grading can occur earlier in the process but only post board creation.

BRIEF DESCRIPTION OF DRAWINGS

Preferred forms of the present invention will now be described with reference to the accompanying drawings in which.

Figure 1:
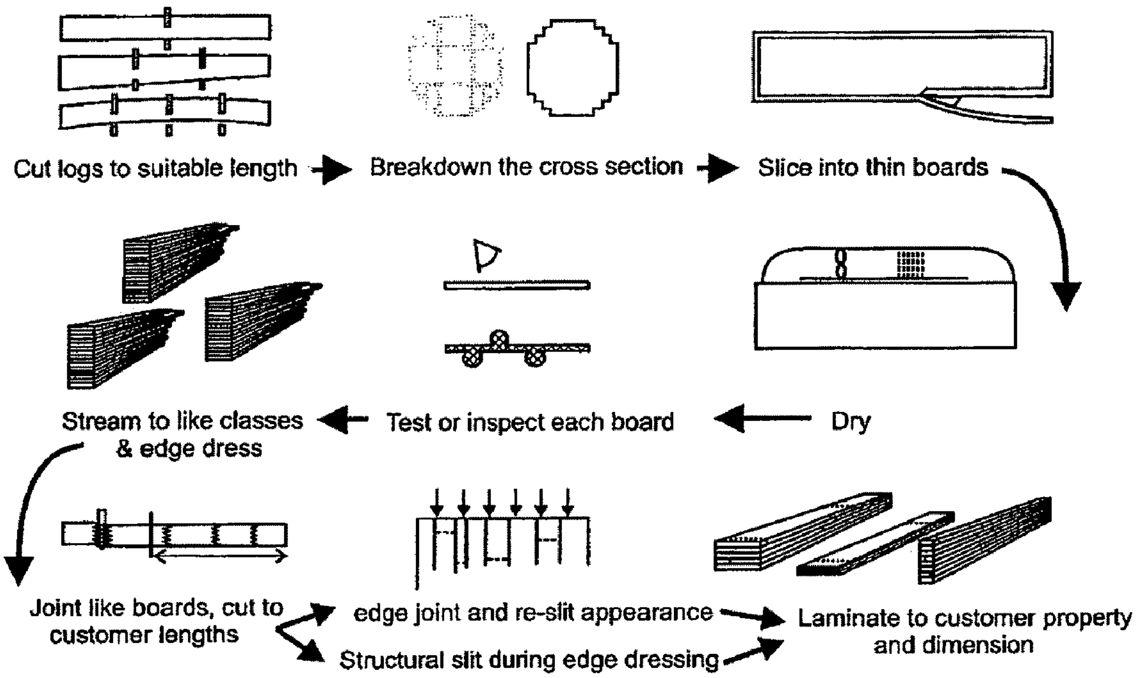
FIG. 1 shows a flow diagram of one process in accordance with the present invention having the capability of streaming components after the drying and inspection steps and preferably prior to finger jointing of individual boards, one stream being to produce laminates to act as beams, studs or the like reliant upon lamination planes normal to the greatest dimension of the board, e.g. forms such as those that by choice of appropriate materials, web space, stronger timber boards, and those which preferably have at least one appearance face where the lamination is parallel to the greater transverse dimension of each board and said at least one appearance face.

In the forming of elongate products from tree stems waste arises in a number of ways.

One is the waste that is always inherent with the cutting width of a sawmill saw (the kerf) which wastes material as sawdust when used as the sole means of longitudinally breaking down logs or a tree stem. Another area of wastage is the general convergence or taper of a tree stem thus leading to waste where flitches or boards of constant breadth and constant thicknesses are to be formed. Still other wastage arises from the to be expected sweep, crook, bow, cup, twist and other distortions of tree stems and/or logs (particularly lower value higher logs) cut therefrom.

Another area of wastage is a lack of value recovery from upper logs owing to the lower value properties being traditionally ascribed to upper logs of a tree stem, to the dimensions and to wood defects thereof.

Various methods have been proposed in order to save as much as possible the wood of a felled tree stem so that unnecessary amounts of the tree stem are not diverted to chipping or waste. See for example log reconstruction as disclosed in EP 0013965.

Longitudinal cutting from log-like structures with a reduced use or no use of saw blades is known. See for example a kerfless splitting procedure such as disclosed in New Zealand Patent 231933, New Zealand Patent 241289, U.S. Pat. Nos. 4,337,809 and/or 5,500,070. See also flitches or planks such as those disclosed in, for example, New Zealand Patent 502160 (PCT/US98/11566 published as WO 98/56549), U.S. Pat. Nos. 7,813,76, 4,086,944 and 4,111,247. One method that has been proposed with a view to saving materials is that disclosed in U.S. Pat. No. 5,500,070 the full content of which is herein included by way of reference. This teaches knife cutting of square timber into thin boards, drying and then their use in multilayer laminated panels.

The present invention makes use of some of the aforementioned technologies including the knife cutting procedures typified by Linck in some of their aforementioned patent specifications. The present invention however recognising, as an example only, the situation of the New Zealand Timber Industry and taking account of the value proposition whilst keeping yields (i.e. by reducing waste) within acceptable limits has been prompted by the situation as follows;

Situation:

The New Zealand Forest Industry faces greater than a 50% increase in annual harvested volumes of Radiata Pine over the next 10 years. The bulk of the incremental volume must be exported.

Log markets for these volumes simply do exist at returns that will provide forest owners even risk free returns.

The single greatest volume market for lumber is structural components, studs, beams, etc.

Radiata Pine will require processing to meet structural export market requirements for size, stability and strength.

The larger structural sizes provide disproportional greater returns per cube, but it is these that are the most difficult to extract from smaller fast grown trees while maintaining superior performance characteristics and high recoveries of the whole log. The longer the product, the more difficult to maintain specification.

The trees and thus logs will always be of random lengths about the targeted harvester length and varying diameters. The market will always require specific lengths and dimensions for which they will pay a premium.

Traditional saw milling and processing techniques can not economically process the whole tree, but prefer the larger and more expensive specified length butt logs as feedstock. Recoveries ex the mill, even before remanufacture typically run at only 45~55%, with output lengths still random.

Resolving an economic solution to this disparity between feedstock and market represents the opportunity.

Design Objectives For Preferred Embodiments of Invention:

Accept any length and diameter of log. Short random lengths will always be the lowest cost feedstock. These primarily arise from the top of the tree, and have little economic value.

Produce any sized structural product that the customer may order in any length.

Produce only to order, not to stock, with no other product sizes arising from the process.

Produce an absolute minimum of waste.

Minimise glue usage as a significant cost component.

Ensure the end product has an overall attractive consumer appearance.

Ensure the product meets structural market specifications.

Make the process as continuous and automated as possible.

Minimise the use of capital and operating costs.

The procedure of the present invention (in preferred embodiments) by emphasis upon board formation (e.g. from short length defect reducing still green or substantially green logs from the lower value upper regions of the tree stem), the subsequent drying thereof and inspection (preferably thereafter) can minimise wastage by ensuring direction (e.g. by machine grading and/or visual inspection) of appropriate materials to appropriate feed streams for ensuring use as components where required in dimensional structural or appearance timber laminate assemblies.

A preferred process for making customer dimensioned structural laminate materials and customer dimensions appearance faced materials (structural or otherwise) preferably involves the following steps:

1) harvesting of the trees
2) breakdown to logs
3) optionally streaming of logs
4) debarking of logs
5) optional streaming of debarked logs
6) transverse cutting of logs where necessary to improve the defect free characteristic of the log with respect to knots, curvature, taper, sweep, etc.
7) profiling of the logs to be used in the process
8) breakdown of the logs into boards;
9) drying of the boards,
10) optional grading of the boards
11) trimming at least one transverse dimension of the boards,
12) optional grading of the boards,
13) and then for streaming into appearance laminates or structural laminates
14) finger jointing boards of like transverse dimension and characteristics, and
15) optional edge jointing into a panel and re-slitting to width
16) optional grading of boards
17) optimising use of such boards in a lamination procedure to provide the desired outcome, such lamination using dry timber adhesives post trimming to customer length of the components of the lamination Preferably for the purpose of finger jointing any suitable conventional dry timber adhesive system can be used.

Adhesives for end joining and/or finger joining include any waterproof glues or others used in any of the prior art laminate structures herein discussed. A particularly preferred adhesive is a resorcinol based adhesive as currently used in LVL type products.

Table 1 shows typical yields from conventional saw milling.

TABLE 1

Typical Yield Conventional Saw Mill

| | Proportion of output by grade | | | | |
|---|---|---|---|---|---|
| Log type | Engineering | No 1 Framing | No 2 Framing | Box Grade | Bds |
| Butt | 7% | 38% | 25% | 25% | 5% |
| No 2 Log | 4% | 21% | 32% | 37% | 6% |
| No 3 Log | 1% | 16% | 34% | 43% | 6% |
| No 4 Log | 0% | 4% | 21% | 58% | 17% |

The present invention provides a significant advantage in value extraction where in Table 2 hereafter stated are the yields from the processes, option 1 being an almost exclusive splitting breakdown of logs as detailed in FIG. 2A whilst option 2 is the hybrid breakdown system (sawing and splitting) detailed by reference to FIG. 2B.

TABLE 2

TARGETED YIELDS (Based on SED projected volumes)

| | | Option 1 | | Option 2 | |
|---|---|---|---|---|---|
| | Diameter OR Process | Minor axis appearance laminates | Major axis structural laminates | Minor axis appearance laminates | Major axis structural laminates |
| Ex Slicer | 200 | 95% | 95% | 70% | 70% |
| | 300 | 96% | 96% | 75% | 75% |
| | 400 | 97% | 97% | 78% | 78% |
| | 500 | 97% | 97% | 80% | 80% |
| | 600 | 97% | 97% | 81% | 81% |
| Loss on input | Drying | 6.5% | 6.5% | 6.5% | 6.5% |
| | Edge clean up | 1.5% | 1.5% | 1.5% | 1.5% |
| | Finger jointing | 0.3% | 0.3% | 0.3% | 0.3% |
| | Panel slicing | 0.8% | 2.2% | 0.8% | 2.2% |
| | Discards (Est.) | 0% | 10% | 3% | 13% |
| Total finished | 200 | 86% | 76% | 62% | 54% |
| | 300 | 88% | 78% | 66% | 58% |
| | 400 | 88% | 78% | 69% | 61% |
| | 500 | 88% | 78% | 71% | 63% |
| | 600 | 89% | 79% | 72% | 63% |

With such acceptable level yields particularly those of option 1 since a value enhanced product is also being provided there is a great prospect of value enhancement of harvested materials particularly when it can be seen that lesser quality feedstock materials can be utilised almost completely. Even option 2 provides more than acceptable yields and whilst providing the same enhanced value products can provide advantages of the kind shown by FIG. 15.

A preferred process according to the present invention, at least for structural lumber, however opts away from panel forming as a precursor to final stick or thin board width determination. Instead it opts for structural timber for taking the sticks to the final customer wanted width and thereafter laminating with appropriate strength and/or stiffness characteristics throughout the structure reliant upon the principles previously stated.

FIG. 1 shows a flow diagram of one process in accordance with the present invention having the capability of streaming components after the drying and inspection steps and preferably prior to finger jointing of individual boards, one stream being to produce laminates to act as beams, studs or the like reliant upon lamination planes normal to the greatest dimension of the board, e.g. forms such as those that by choice of appropriate materials, web space, stronger timber boards, and those which preferably have at least one appearance face where the lamination is parallel to the greater transverse dimension of each board and said at least one appearance face.

Breakdown is preferably but not necessarily as follows:

band sawing for primary breakdown band and/or circular sawing for secondary breakdown a slicing or fine finish sawing for final breakdown to laminar thickness ("tertiary breakdown").

Cutting to length whether lamina or laminate is by sawing (e.g. circular sawing).

FIGS. 2 (i.e. 2A, 2B) and 4 (i.e. 4A, 4B) show preferred patterns of both primary, secondary and tertiary breakdown. These have the effects of (i) avoiding as far as is practicable spike knots, and (ii) minimising the number of growth rings in each stick or board thereby (a) minimising the range of properties within a single stick and (b) maximising the range of properties amongst sticks.

Figure 2A:
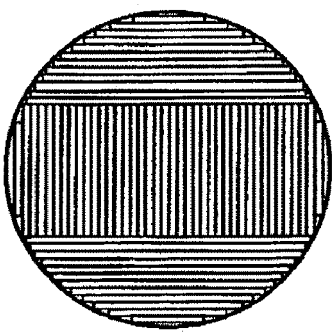
FIG. 2A shows a first option for breakdown of logs of similar dimension where any machining other than splitting and profiling is kept to a minimum (it being appreciated that rebates can be machined in by cutting, milling, routing or the like to allow better location relative to splitting apparatus)

FIG. 2A shows a first option for breakdown of logs of similar dimension where any machining other than splitting and profiling is kept to a minimum (it being appreciated that rebates can be machined in by cutting, milling, routing or the like to allow better location relative to splitting apparatus).

Figure 2B:
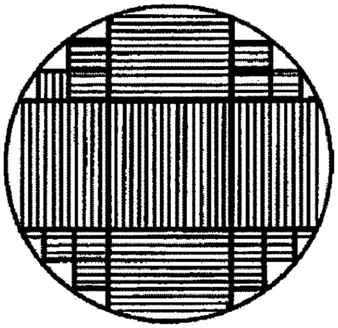
FIG. 2B shows by a mixture of heavy lines and less heavy lines respectively saw cuts and splitting during a breakdown.

FIG. 2B shows by a mixture of heavy lines and less heavy lines respectively saw cuts and splitting during a breakdown.

Figure 3A:
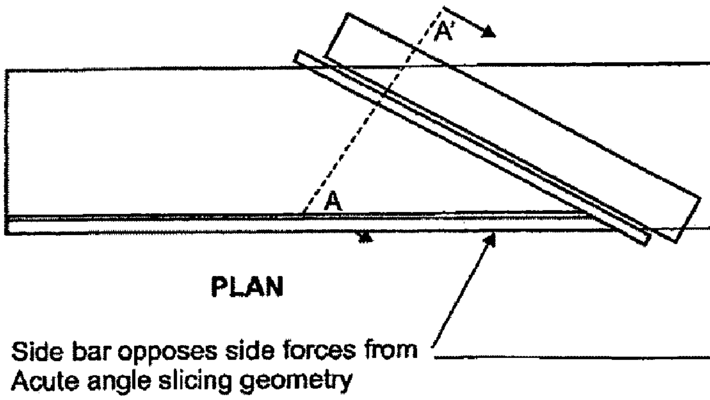
FIG. 3A shows a wooden billet such as that provided centrally of the breakdown option of FIG. 2B showing wooden billet location relative to a locating side bar to oppose side forces from the acute angle slicing geometry.
Figure 3B:
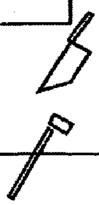
FIG. 3B shows the section of AA of FIG. 3B.
Figure 3C:
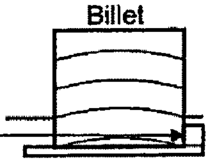
FIG. 3C shows the end elevation BB.

FIG. 3A shows a wooden billet such as that provided centrally of the breakdown option of FIG. 2B showing wooden billet, location relative to a locating side bar to oppose side forces from the acute angle slicing geometry.

Figure 4A:
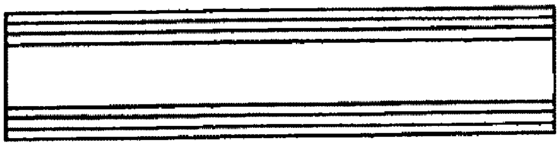
FIGS. 4A and 4B shows side elevation and end view respectively of a slicing pattern for a short log to minimize drying deformation by cutting boards symmetrically about the log centre line.
Figure 4B:
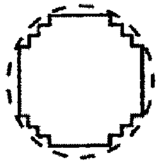
Figure 4A:
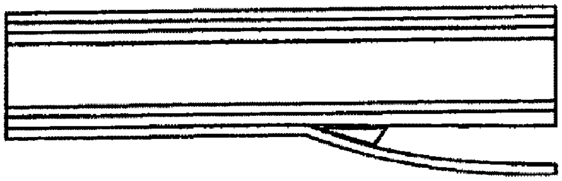

FIGS. 4A and 4B shows side elevation and end view respectively of a slicing pattern for a short logs to minimise drying deformation by cutting boards symmetrically about the log centre line.

Figure 4D:
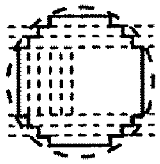
FIG. 4C shows in side elevation and FIG. 4D an end view showing how progressive slicing can provide boards of the required timber thickness.

FIG. 4C shows in side elevation and FIG. 4D an end view showing how progressive slicing can provide boards of the required timber thickness.

Figure 5:
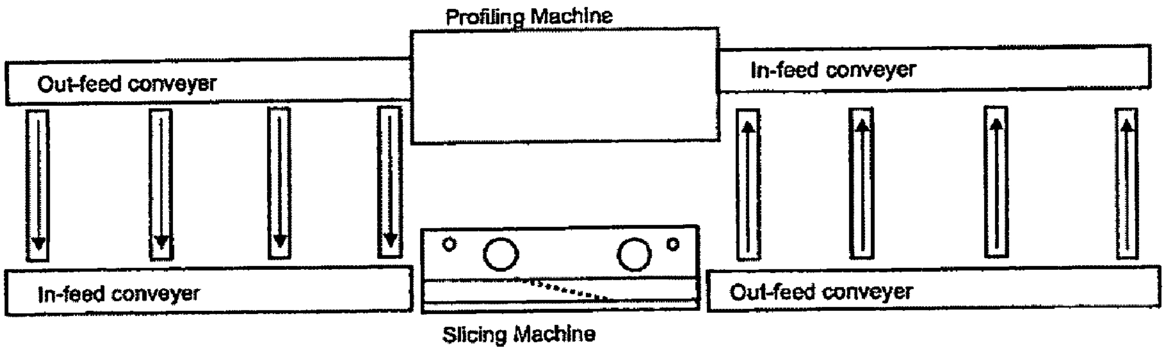
FIG. 5 shows a plan view of one arrangement whereby after pre-heating the logs can be introduced to a profiling and slicing process that may include the slicing machine and profiling machine in series, such apparatus being appropriate for the option shown by reference to FIG. 2A.

FIG. 5 shows a plan view of one arrangement whereby after pre-heating the logs can be introduced to a profiling and slicing process that may include the slicing machine and profiling machine in series, such apparatus being appropriate for the option shown by reference to FIG. 2A.

Figure 6:
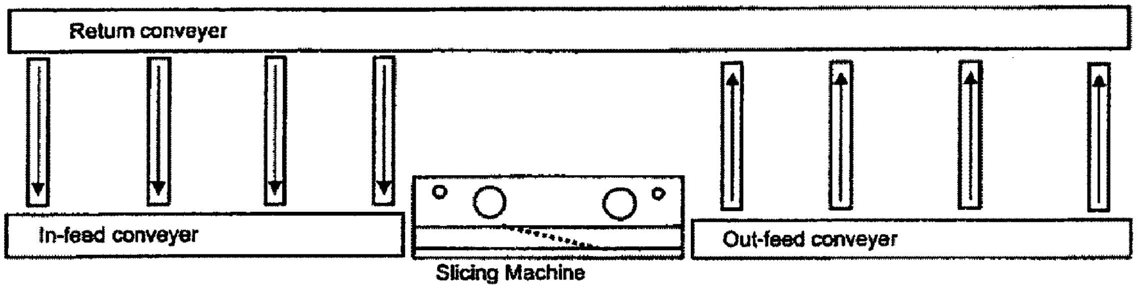
FIG. 6 shows apparatus from above adapted after heating the logs to provide a standard slicing process, such slicing process following a breakdown of the logs as detailed in FIG. 2B.

FIG. 6 shows apparatus from above adapted after heating the logs to provide a standard slicing process, such slicing process following a breakdown of the logs as detailed in FIG. 2B.

Figure 7A:
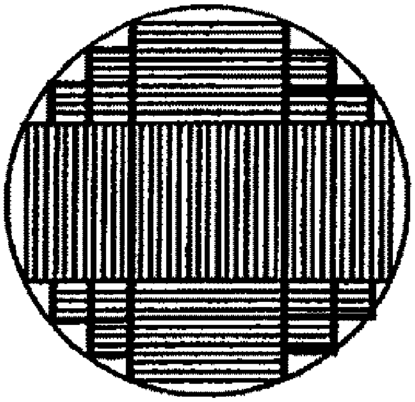
FIG. 7A is a similar view to that of FIG. 2B but showing how the heavy line saw cuts can provide a number of rectangular sections or square sections perhaps of a multiple of 46 mm (or any green pre-dressed finished dimension required by the customer) with the larger sections concentric with the log centre, FIG. 7B showing sections with at least one side of a relatively large dimension which can be sent to wide slicer and FIG. 7C showing a number of square or rectangular sections of a small which can be sent to a smaller slicer.

FIG. 7A is a similar view to that of FIG. 2B but showing how the heavy line saw cuts can provide a number of rectangular sections or square sections perhaps of a multiple of 46 mm (or any green pre-dressed finished dimension required by the customer) with the larger sections concentric with the log centre.

Figure 7B:
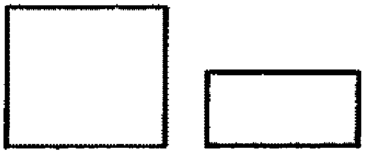
Figure 7C:

FIG. 7B showing sections with at least one side of a relatively large dimension which can be sent to wide slicer and FIG. 7C showing a number of square or rectangular sections of a small which can be sent to a smaller slicer.

Figure 8:
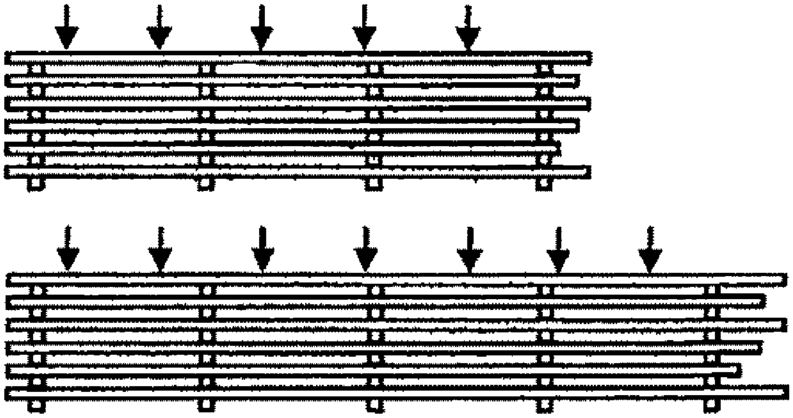
FIG. 8 shows how the sliced boards can be prepared for drying whilst being restrained to ensure the dry boards exit the dryer more or less straight, the typical process being to stack in several batches of like length and weight before charging to a batch dryer, but other drying process and/or a continuous drying process can be used.

FIG. 8 shows how the sliced boards can be prepared for drying whilst being restrained to ensure the dry boards exit the dryer more or less straight, the typical process being to stack in several batches of like length and weight before charging to a batch dryer, but other drying process and/or a continuous drying process can be used.

Figure 9:
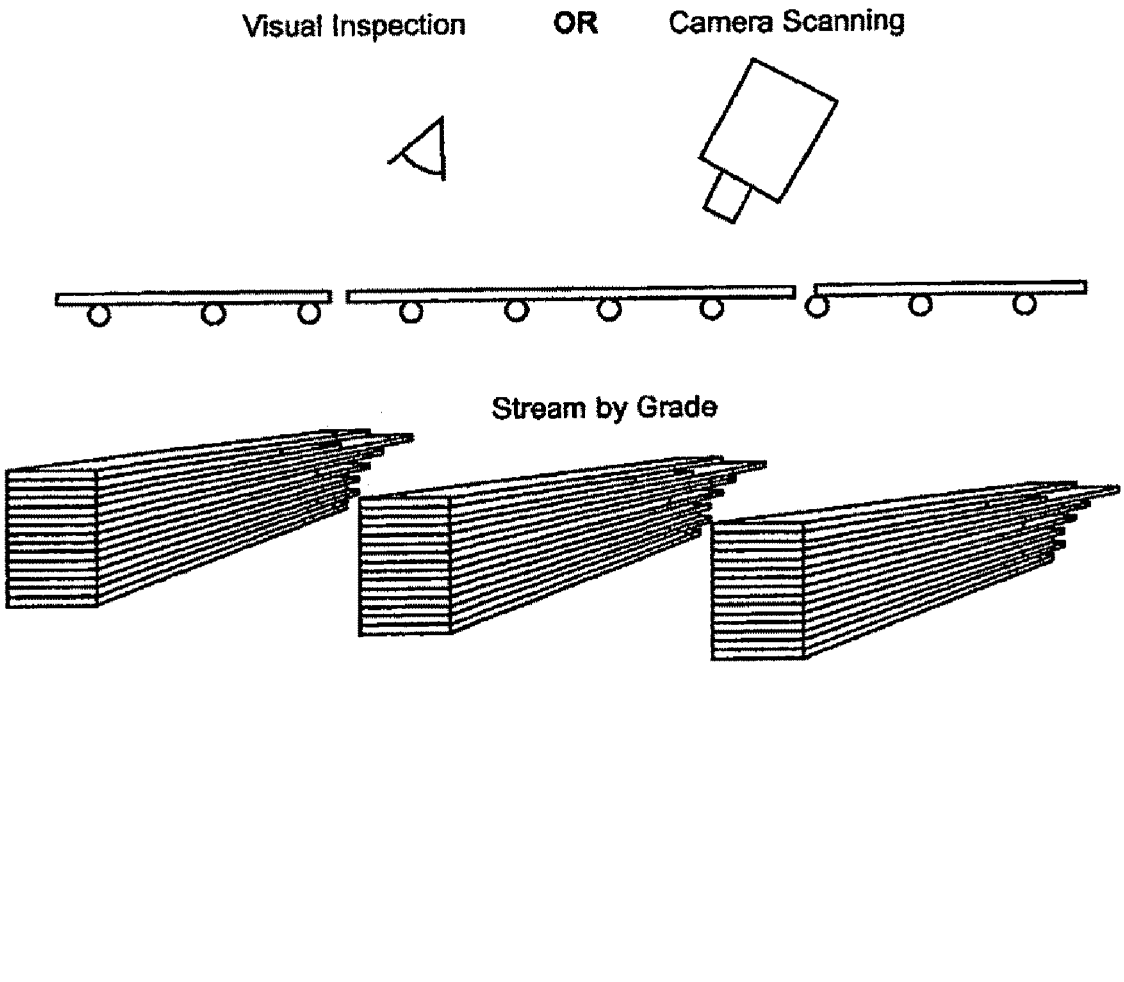
FIG. 9 shows an optional visual or camera scan for appearance critical features and streaming according to these features.

FIG. 9 shows an optional visual or camera scan for appearance critical features and streaming according to these features.

Figure 10:
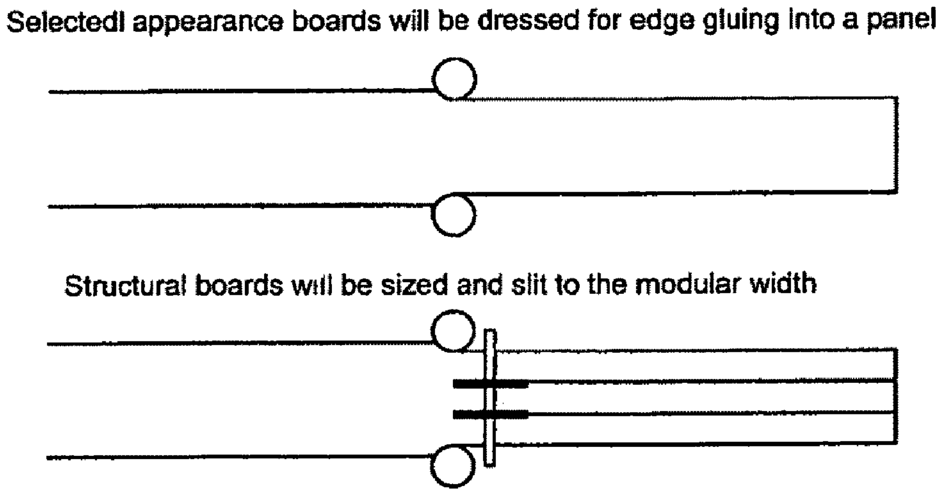
FIG. 10 shows the edge dressing or optional (for structural) combined edge dressing and slitting (by guillotining or fine sawing) operation.

FIG. 10 shows the edge dressing or optional (for structural) combined edge dressing and slitting (by guillotining or fine sawing) operation.

Figure 11:
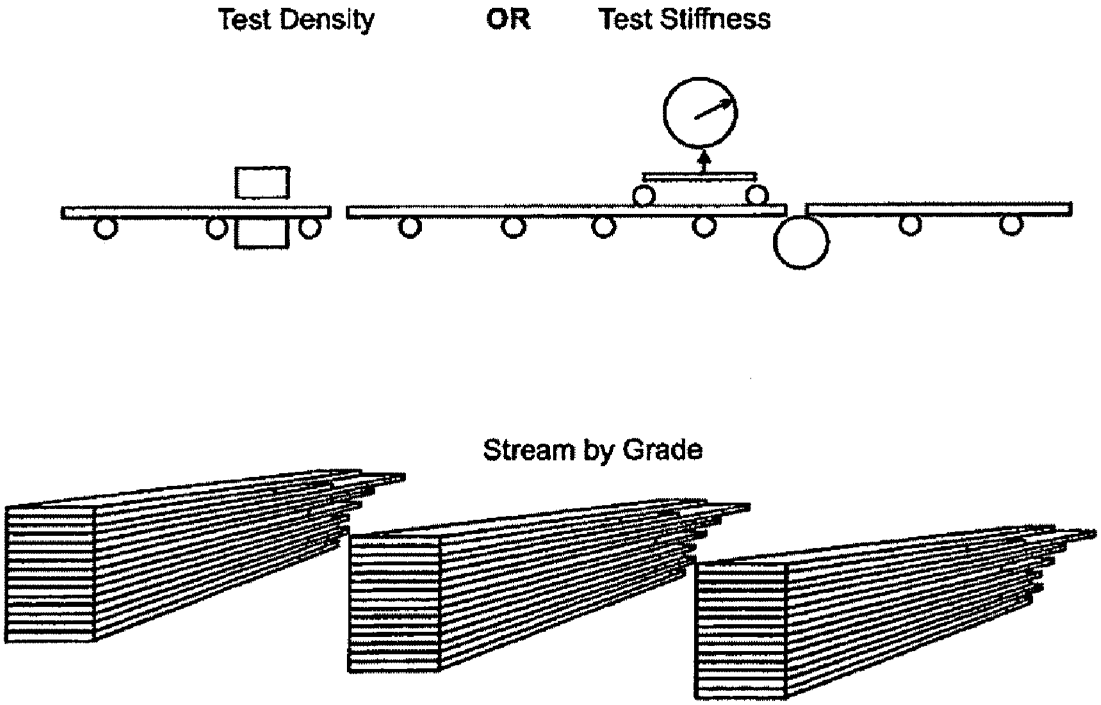
FIG. 11 shows an optional density test or stiffness test for structural properties and streaming according to these features.

FIG. 11 shows an optional density test or stiffness test for structural properties and streaming according to these features.

Figure 12:
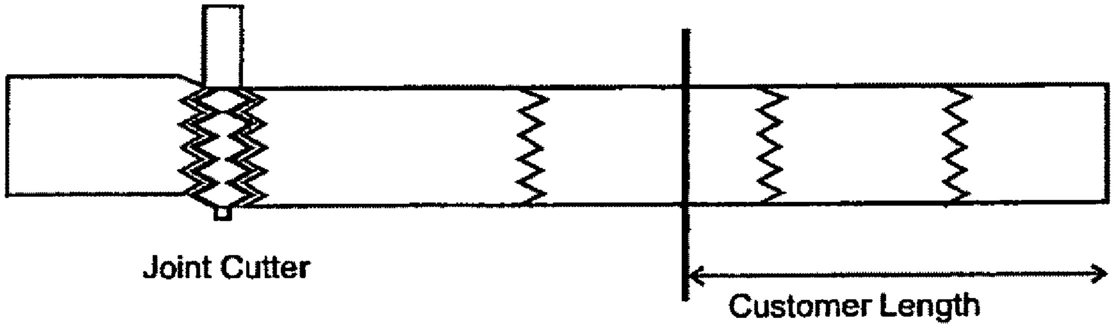
FIG. 12 shows a finger jointing process.

FIG. 12 shows a finger jointing process.

Figure 13A:
FIG. 13A is an end view of a panel formed by edge gluing of panels post finger jointing whilst
Figure 13B:
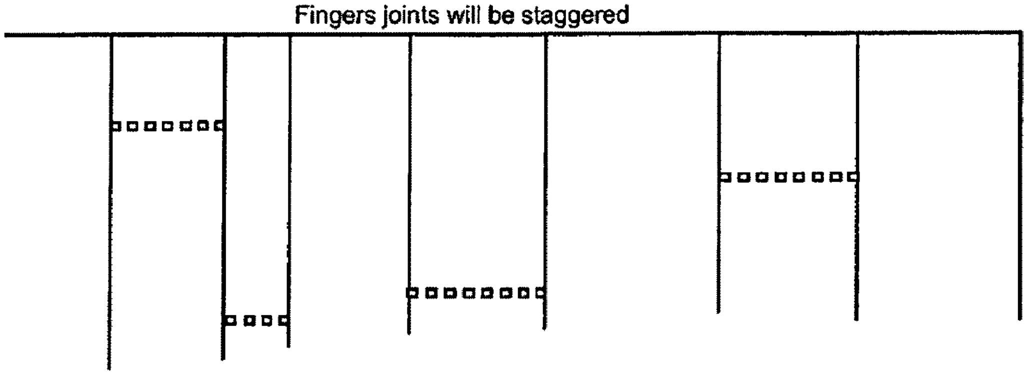
FIG. 13B is a partial plan view of such a panel as shown in FIG. 13A showing the finger joints spaced along the length, such a panel being adapted for slitting parallel to the edge joints to a desired customer board width prior to lamination.

FIG. 13A is an end view of a panel formed by edge gluing of panels post finger jointing whilst FIG. 13B is a partial plan view of such a panel as shown in FIG. 13A showing the finger joints spaced along the length, such a panel being adapted for slitting parallel to the edge joints to a desired customer board width prior to lamination.

Figure 13C:
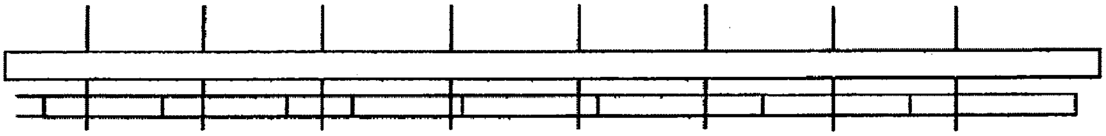
FIG. 13C shows such a panel slitting to provide constant width boards from a panel as shown in FIG. 13A and FIG. 13D with the broken lines parallel to the edge joints shows the lines of guillotining into constant width boards, FIGS. 14A and 14B showing how boards produced from the guillotine cutting as described with respect to FIG. 13D can be face to face glue laminated to provide a product preferably but not necessarily with one at least appearance face on a face that is parallel to the lamination plane and which is a face of greater transverse dimension.
Figure 13D:
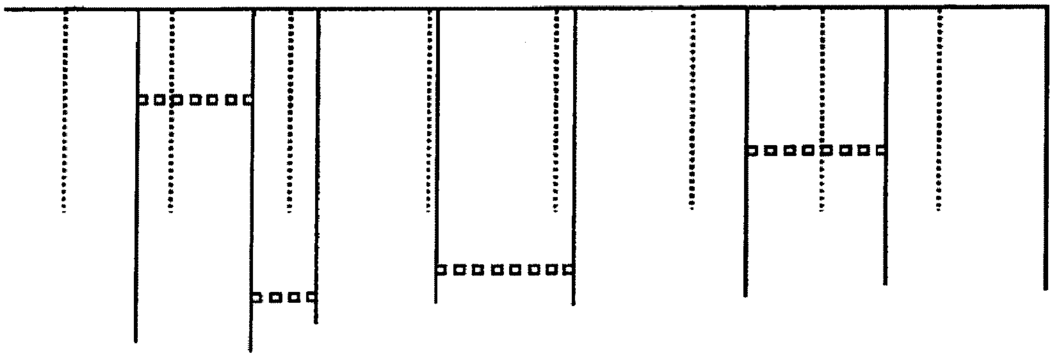

FIG. 13C shows such a panel slitting to provide constant width boards from a panel as shown in FIG. 13A and FIG. 13D with the broken lines parallel to the edge joints shows the lines of guillotining into constant width boards.

Figure 14A:
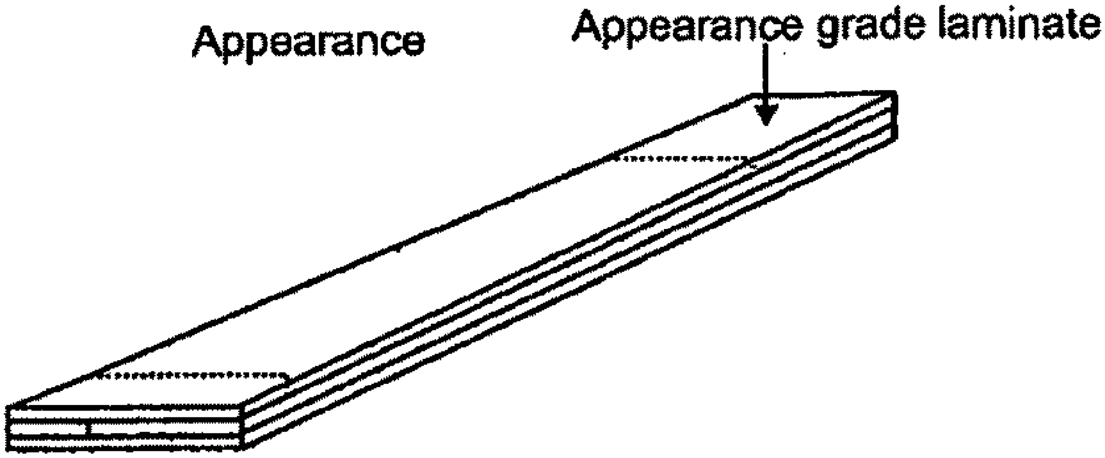
Figure 14B:
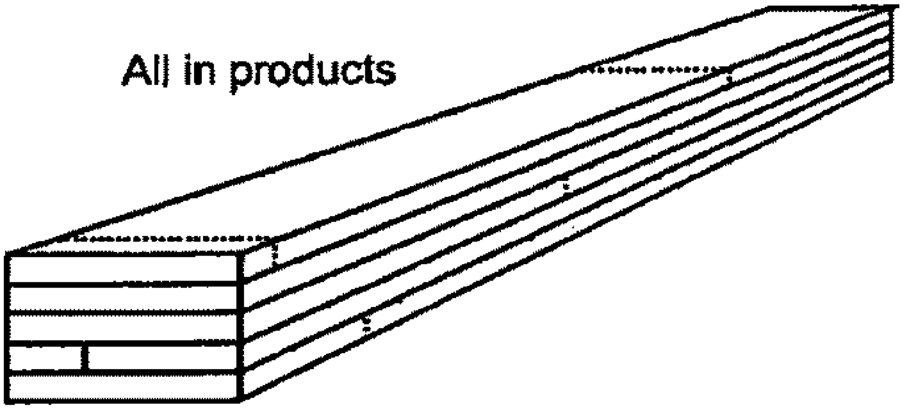

FIGS. 14A and 14B showing how boards produced from the guillotine cutting as described with respect to FIG. 13D can be face to face glue laminated to provide a product preferably but not necessarily with one at least appearance face on a face that is parallel to the lamination plane and which is a face of greater transverse dimension.

Figure 15:
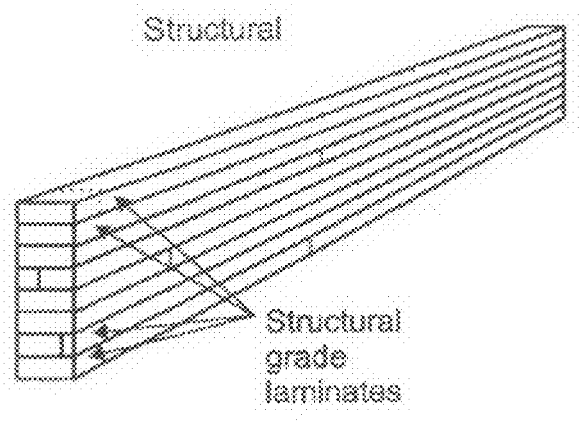
FIG. 15 shows another lamination option [not usually requiring panel formation as described with reference to FIGS. 13A through 13D nor the consequent slitting provided they are provided more or less to the desired width of board by the breakdown system albeit they may require some edge dressing to customer width], such boards being laminated with lamination planes normal to the planes of greater board transverse dimension.

FIG. 15 shows another lamination option [not usually requiring panel formation as described with reference to FIGS. 13A through 13D nor the consequent slitting provided they are provided more or less to the desired width of board by the breakdown system albeit they may require some edge dressing to customer width], such boards being laminated with lamination planes normal to the planes of greater board transverse dimension.

Figure 16:
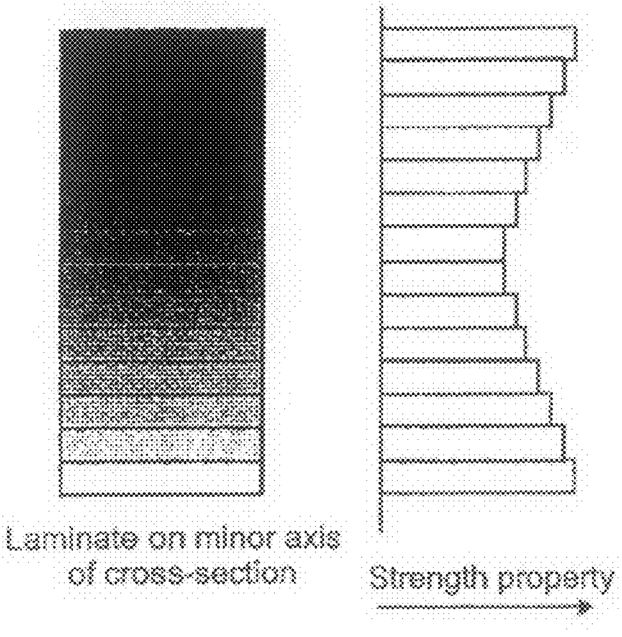
FIG. 16 shows how for a laminate as shown in FIG. 15 each board shown is positioned so as to maximise greater strength away from the centre of the laminate, thereby, by following the principles of an "I" beam, using lesser strength boards as web spacers for the higher strength boards thereby better to resist deflection of the beam in a plane normal to the lamination planes.

FIG. 16 shows how for a laminate as shown in FIG. 15 each board shown is positioned so as to maximise greater strength away from the centre of the laminate, thereby, by following the principles of an "I" beam, using lesser strength boards as web spacers for the higher strength boards thereby better to resist deflection of the beam in a plane normal to the lamination planes.

Figure 17:
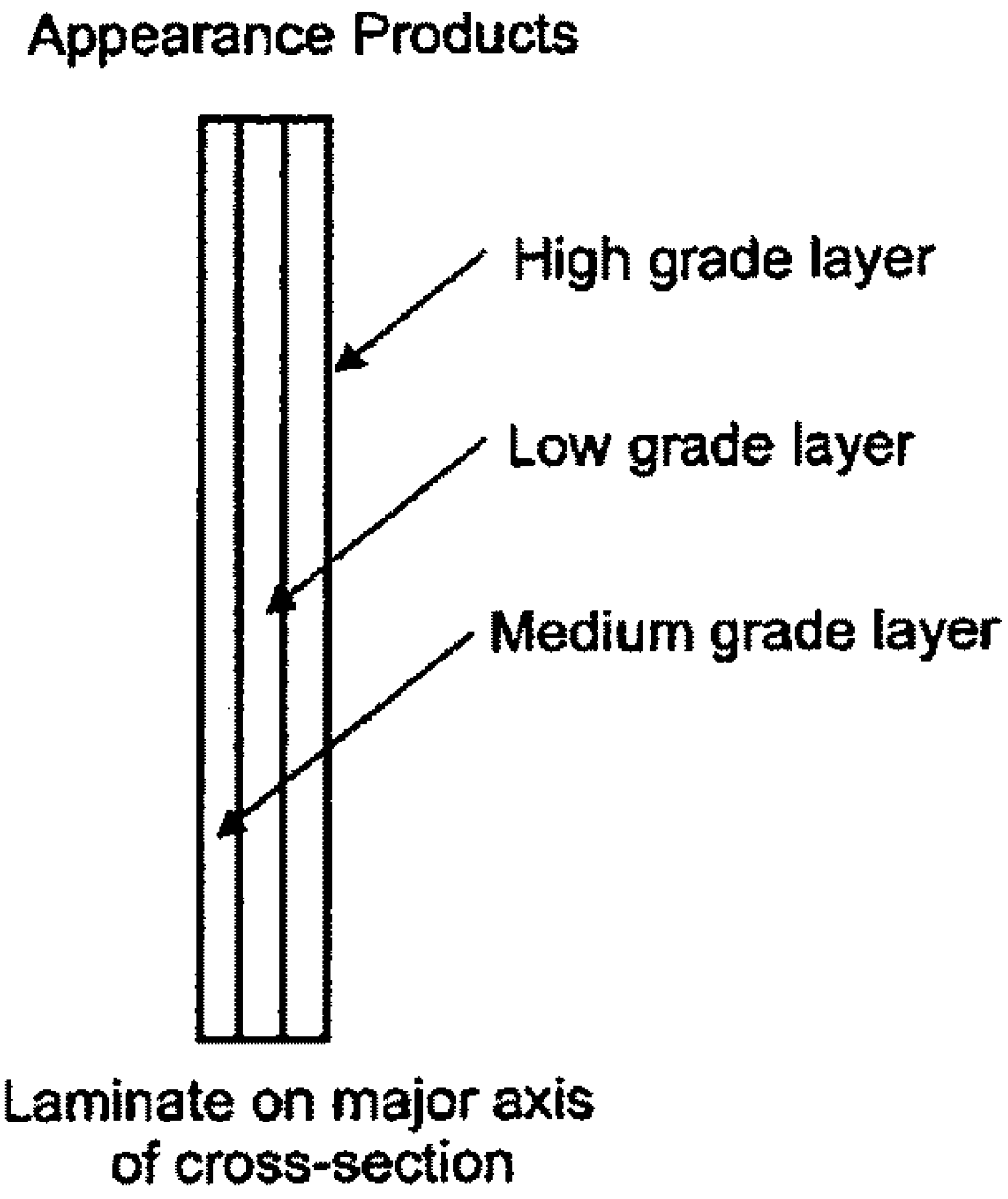
FIG. 17 shows how for the arrangement as shown in FIG. 14A there is preferably a high grade layer on one side, a lower grade layer centrally and a medium grade layer on the reverse face.

FIG. 17 shows how for the arrangement as shown in FIGS. 14A there is preferably a high grade layer on one side, a lower grade layer centrally and a medium grade layer on the reverse face.

Figure 18:
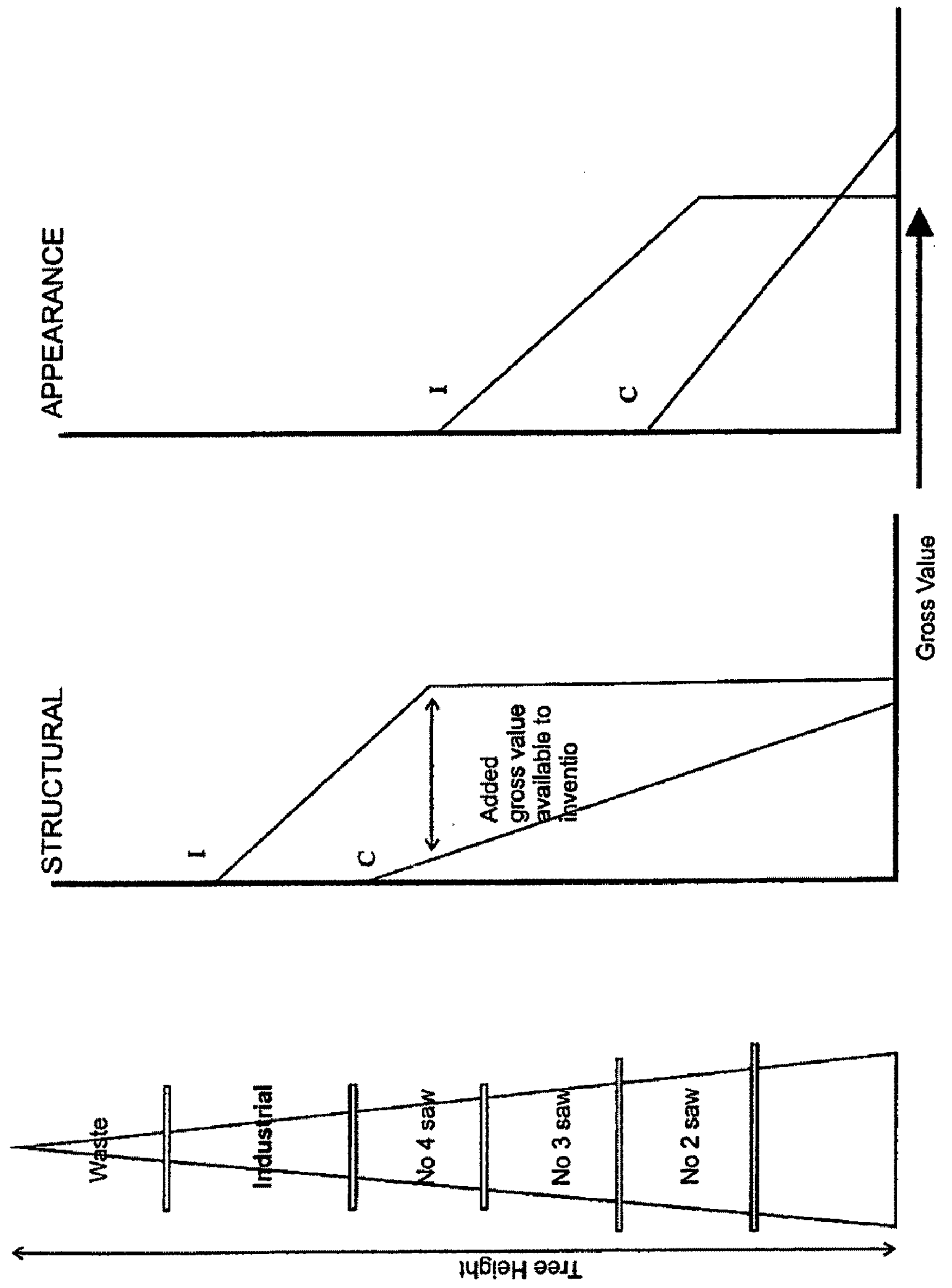
FIG. 18 shows by relationship to a tapering tree stem how gross value by a process of the present invention can deviate from the structural and appearance lines of a conventional saw mill, the line marked "C" being that of conventional sawing and the line marked "I" being that of the invention.

FIG. 18 shows by relationship to a tapering tree stem how gross value by a process of the present invention can deviate from the structural and appearance lines of a conventional saw mill, the line marked "C" being that of conventional sawing and the line marked "I" being that of the invention.

Figure 19A:
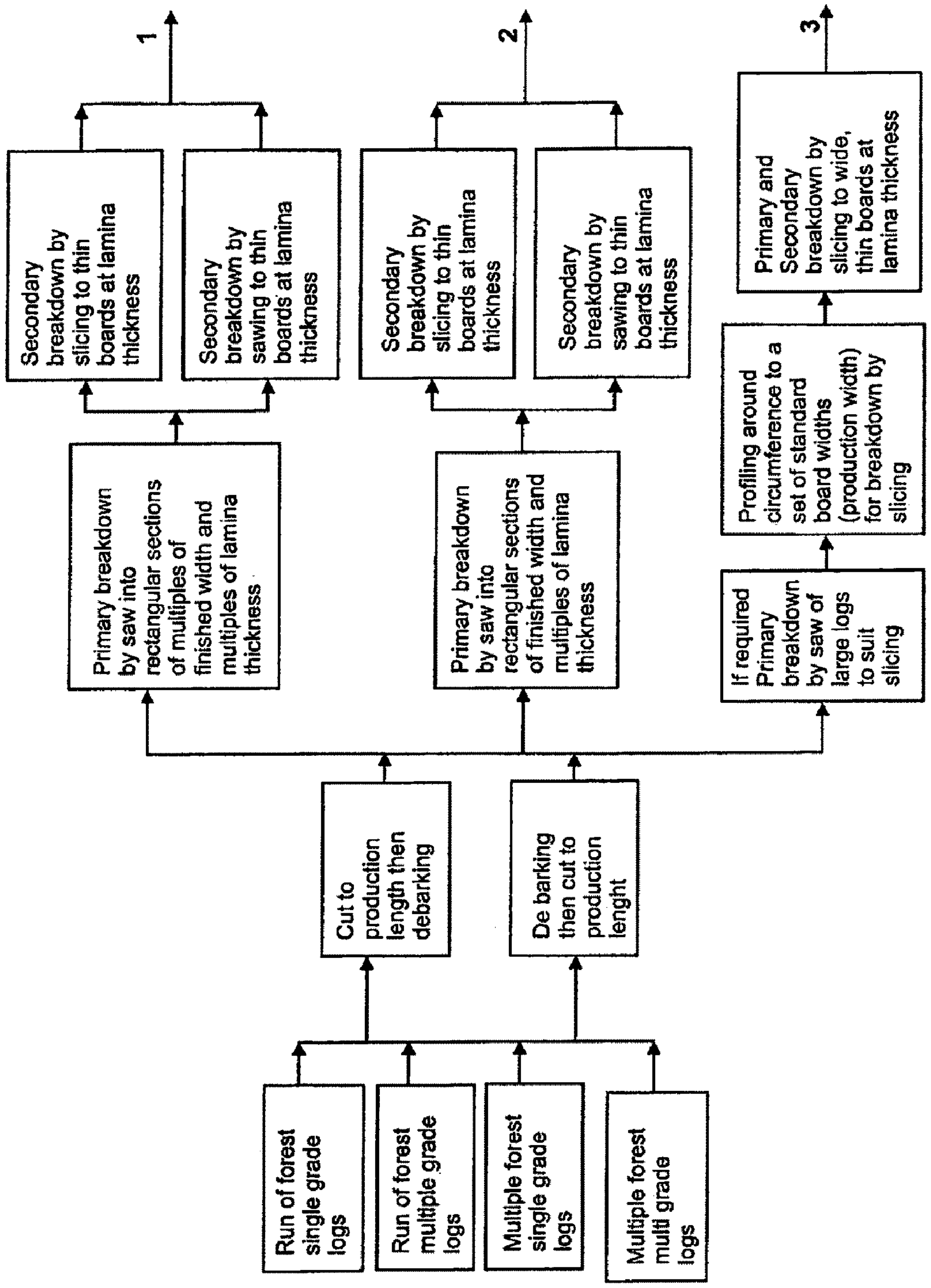
FIGS. 19A to 19C show a process from beginning to end in accordance with preferred options of the present invention, there being shown an optional departure from the manufacture of purely structural engineered timber where, as might be in demand from time to time, appearance engineered timber is required, FIGS. 19A to 19C nevertheless show how in the preferred form of the present invention with a view to enhancing efficiencies the feedstock is of single forest or multiple forest derived single and/or multi grade logs, FIG. 20 graphically shows representative MOE distributions of "clear sawn lumber" verses "thin boards inclusive of defects" from low grade logs (as published by NZFRI and our testing respectively), along with an inserted table of expected structural grade outputs of sawn lumber from similar logs (published by NZFRI)

It can be seen from FIG. 19A (the full textual content of which is incorporated herein) that a run of forest single grade logs, a run of forest multiple grade logs, multiple forest single grade logs and/or multiple forest multi grade logs can be used even if of a short length or deliberately so cut.

Figure 19B:
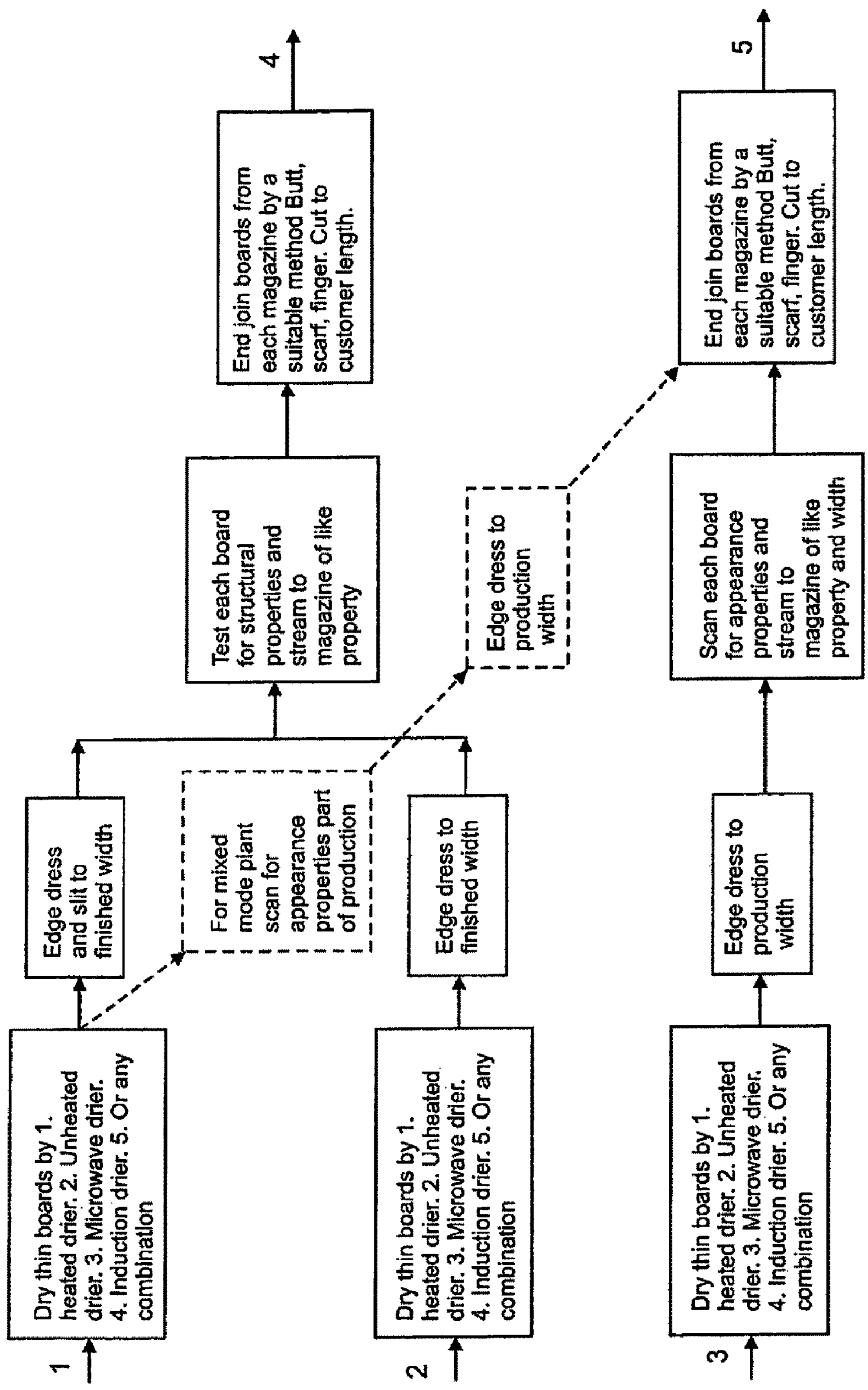
Figure 19C:
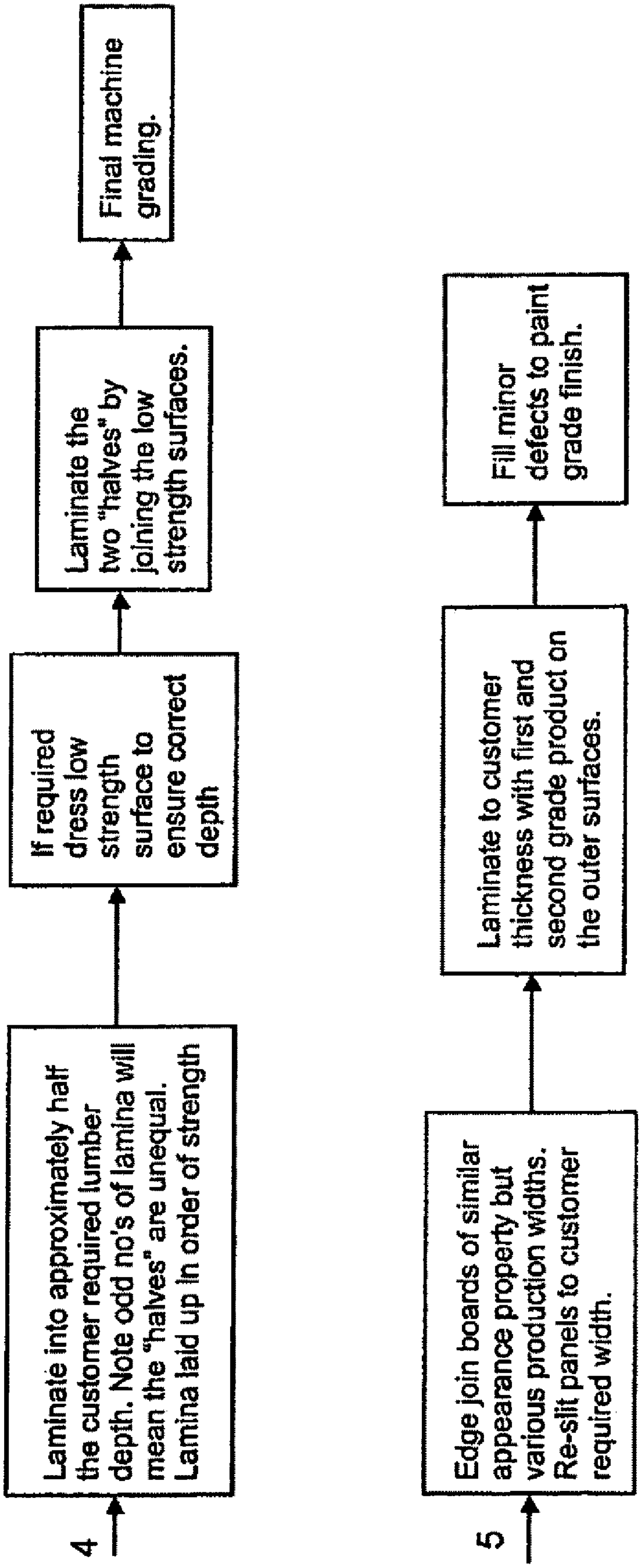

Through a variety of different break down procedures, preferably all to minimise wastage or unnecessary wastage having regard to the procedures being performed, thin boards at laminar thickness can be produced for drying by any appropriate means such as those disclosed in FIG. 19B, whereupon by a variety of different procedures, each board of a desired width can be streamed as to strength and/or stiffness or other structural properties prior to end-joining by any suitable procedure e.g. butt, scarf, finger, etc whereupon thereafter, if desired, and preferably prior to lamination, they are cut to a customer length. Thereafter lamination by any suitable profiling procedure is adopted optionally with other machine intervention. FIG. 19C deals with certain options in that respect.

Also shown in FIGS. 19B and C is an option for mixed mode plants scanning for appearance properties with appropriate edge dressing to production width prior to end-joining with like boards. Thereafter if desired the panel forming by edge joining and cutting to various production widths can follow thereby allowing formation by lamination to a desired appearance product form.

FIG. 20 graphically shows representative MOE distributions of "clear sawn lumber" verses "thin boards inclusive of defects" from low grade logs (as published by NZFRI and our testing respectively), along with an inserted table of expected structural grade outputs of sawn lumber from similar logs (published by NZFRI).

Figure 21:
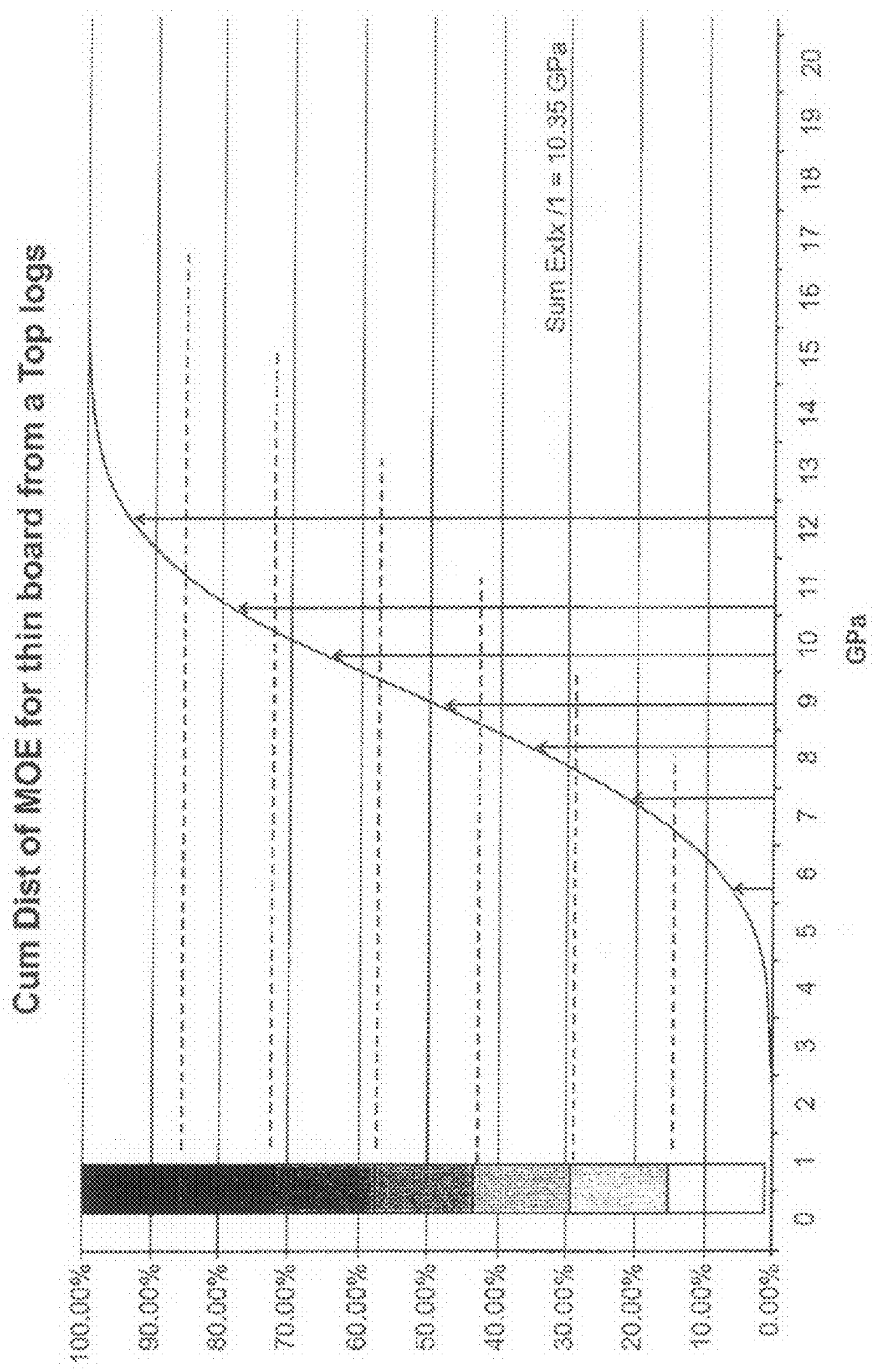
FIG. 21 shows the cumulative distribution of MOE for the thin boards from FIG. 20.
Figure 22:
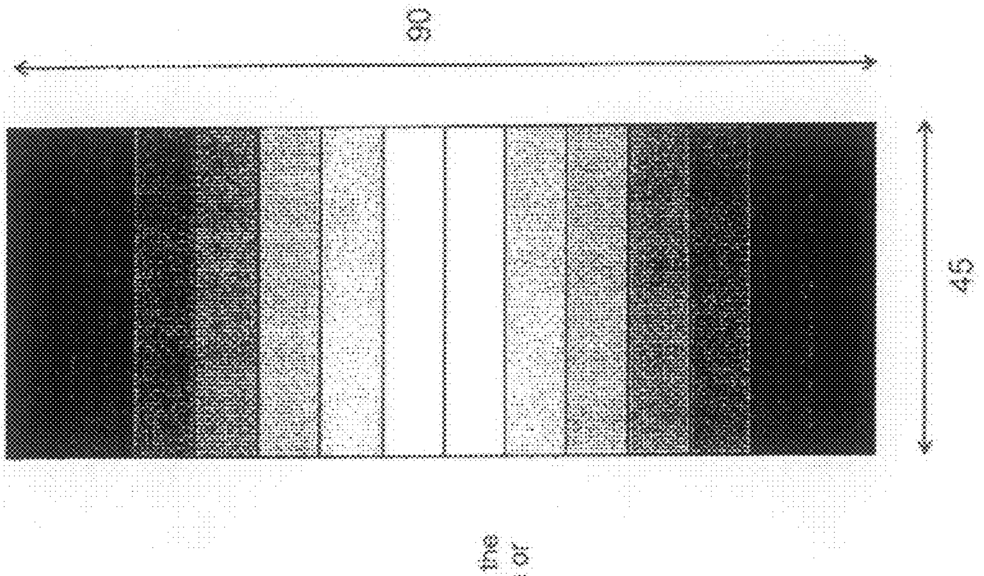
FIG. 22 shows how multiple sticks or thin boards formed and end jointed in accordance with the present invention can be profiled within a laminate, the darker shade boards being those of greater strength and/or stiffness (i.e. MOE) and those of lighter shade being those of less strength and/or stiffness (i.e. MOE)

FIG. 21 shows the cumulative distribution of MOE for thin boards,

FIG. 22 shows how by way of example how multiple sticks or thin boards formed and end jointed in accordance with the present invention can be profiled with the darker shade boards being those of greater strength and/or stiffness and those of lighter shade being those of less strength and/or stiffness.

Figure 23:
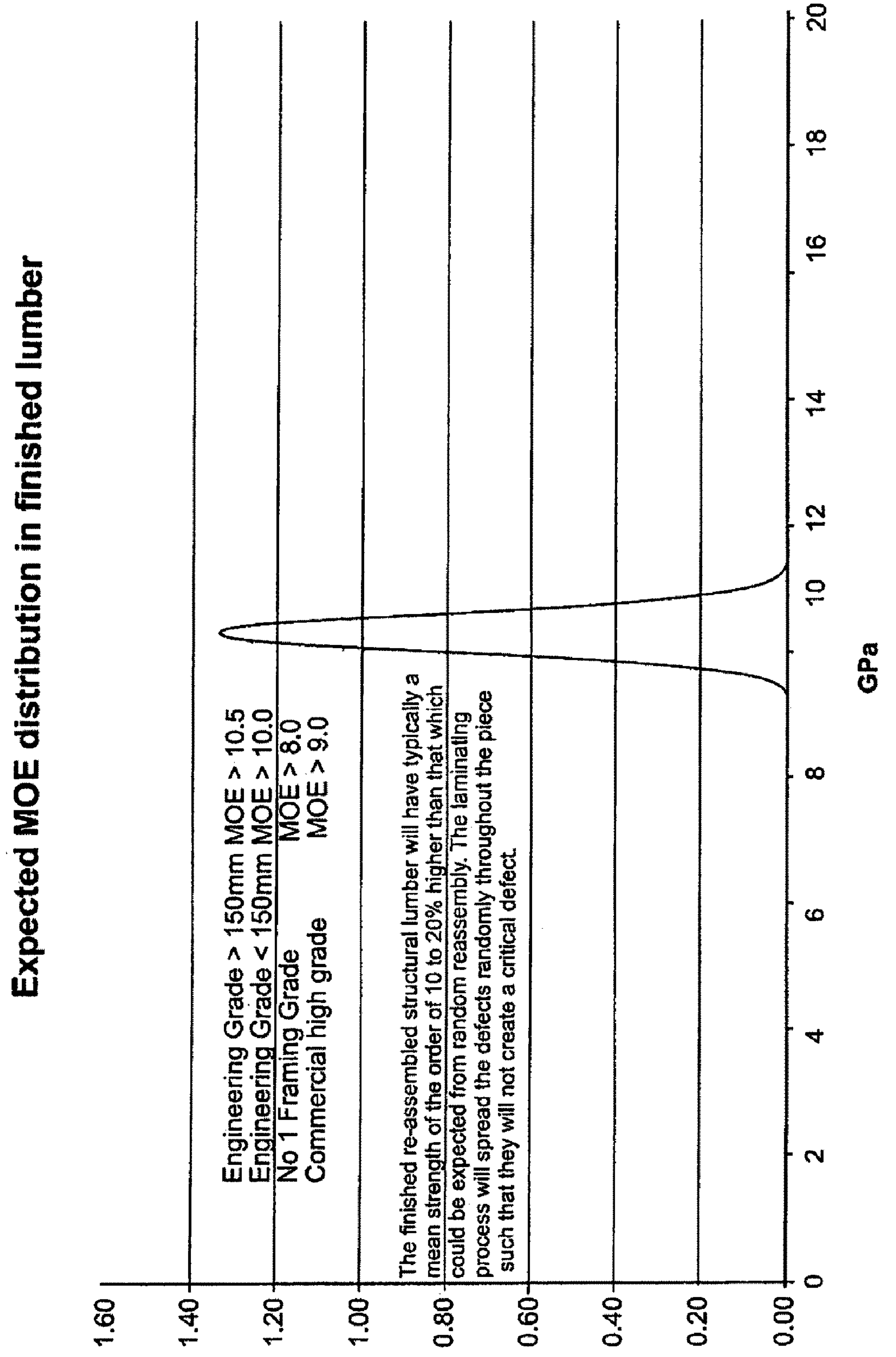
FIG. 23 shows the expected MOE distribution in our final assembled product e.g. as in FIG. 22.

FIG. 23 shows the expected MOE distribution in our final assembled product e.g. as in FIG. 22.

Figure 24:
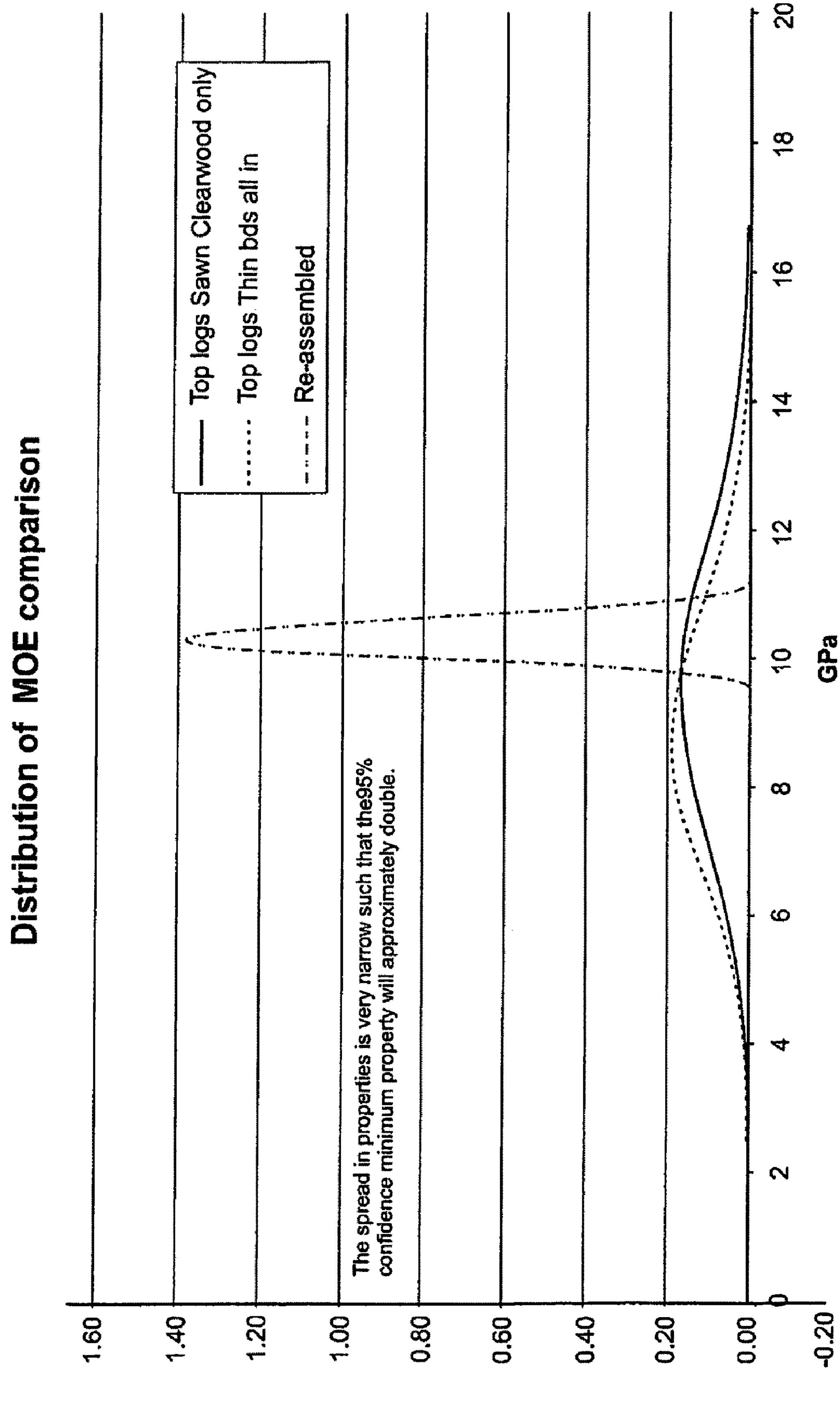
FIG. 24 is an overlay of FIG. 23 and FIG. 20 clearly showing expected increase in MOE (e.g. as an indicator of stiffness or strength or both).

FIG. 24 is an overlay of FIG. 23 and FIG. 20 clearly showing expected increase in MOE (e.g. as an indicator of stiffness or strength or both).

What we claim is:

1. An engineered elongate structural lumber product of square or rectangular cross section and having a length L greater than 2.4 m, said engineered elongate structural lumber product comprising a laminate having a width face to face of at least four engineered laminae of identical rectangular cross-section, the engineered laminae (a) having a width of at least a full dimension on one transverse axis of the structural lumber product, (b) being layered serially to provide, with accumulated cross-sectional thickness of mutually adhered engineered laminae, at least another full dimension of the structural lumber product on the other transverse axis of the structural lumber product, (c) having at least the length L; and (d) being derived from end-wise jointed uniform laminar thickness boards or sticks of less than the length L of rectangular section and of no greater than 17 mm thickness and of a width not substantially greater than the width of the square cross-section or lesser dimension of the rectangular cross-section of the product, (e) being each from a ranked stream of contributing sticks, the sticks of each stream being ranked by a stick by stick test, post drying, for a strength or stiffness, or both, characteristic into a ranked category; and (f) being each derived from said sticks of said thickness less than 17 mm ranked by such characteristic or characteristics into at least three ranked categories;

a profiled layering of said engineered laminae across said another full dimension of the structural lumber product, profiled by the ranking of the contributing sticks of each engineered laminae and the strength or stiffness, or both, characteristic to derive the MOE distribution wanted for the structural lumber product.

2. The engineered elongate structural lumber product of claim 1, wherein said engineered laminae are greater than 4 mm thick.

3. The engineered elongate structural lumber product of claim 1, wherein said engineered laminae are less than 11 mm thick.

4. The engineered elongate structural lumber product of claim 1, wherein said engineered laminae are of 46 mm width.

5. The engineered elongate structural lumber product of claim 1, wherein said contributing sticks are from 0.5 to 1.2 meters long.

6. The engineered elongate structural lumber product of claim 1, wherein the end wise joints of contributing sticks are finger joints.

7. The engineered elongate structural lumber product of claim 1, wherein there are greater than four engineered laminae in the product.

8. The engineered elongate structural lumber product of claim 1, wherein the contributing sticks have been ranked into at least four ranked categories.

9. The engineered elongate structural lumber product of claim 1, wherein the contributing sticks have been ranked into from four to eight ranked categories.

10. The engineered elongate structural lumber product of claim 1, wherein said profiled layering of said engineered laminae is derived from contributing sticks of greatest strength or stiffness, or both, to the outside.

* * * * *